US012471603B2

(12) United States Patent
Akhumyan et al.

(10) Patent No.: US 12,471,603 B2
(45) Date of Patent: Nov. 18, 2025

(54) HIGH PRESSURE PROCESSING OF FOODS AND FOOD SUPPLEMENTS

(71) Applicant: Foremost Technologies and Products, Inc., Los Angeles, CA (US)

(72) Inventors: Leonid Akhumyan, Los Angeles, CA (US); Inga Hakhumyan, Los Angeles, CA (US); Yana Mkrtichyan, Los Angeles, CA (US)

(73) Assignee: Foremost Technologies and Products, Inc., Los Angeles, CA (US)

( * ) Notice: Subject to any disclaimer, the term of this patent is extended or adjusted under 35 U.S.C. 154(b) by 0 days.

(21) Appl. No.: 17/713,623

(22) Filed: Apr. 5, 2022

(65) Prior Publication Data

US 2022/0361532 A1 Nov. 17, 2022

Related U.S. Application Data

(63) Continuation of application No. 17/186,892, filed on Feb. 26, 2021, now Pat. No. 11,324,239, which is a
(Continued)

(51) Int. Cl.
*A23L 3/015* (2006.01)
*A23B 2/10* (2025.01)
(Continued)

(52) U.S. Cl.
CPC ............. *A23B 2/103* (2025.01); *A23B 70/00* (2025.01); *A23C 9/12* (2013.01); *A23C 9/127* (2013.01);
(Continued)

(58) Field of Classification Search
CPC . A23C 23/00; A23C 2210/15; A23C 2260/05; A23C 2270/15; A23L 3/015;
(Continued)

(56) References Cited

U.S. PATENT DOCUMENTS 3,796,813 A 3/1974 Kurland
6,786,330 B2 * 9/2004 Mollstam ........... B65D 81/3222
206/219
(Continued)

FOREIGN PATENT DOCUMENTS

EP 1 186 654 B1 7/2004
WO WO 2014/209912 A1 12/2014
WO WO 2017/054052 A1 4/2017

OTHER PUBLICATIONS

Fermentation NPL, published Jun. 22, 2015, https://web.archive.org/web/20150622031822/https://www.britannica.com/science/fermentation (Year: 2015).*
(Continued)

*Primary Examiner* — Erik Kashnikow
*Assistant Examiner* — Bryan Kim
(74) *Attorney, Agent, or Firm* — Thompson Coburn LLP; William A. Holtz

(57) ABSTRACT

The present invention relates to high pressure processing (HPP) methods of and containers for preparation of food products such as solid or semi-solid foods, beverages and food supplements containing high-pressure sensitive probiotics and other high-pressure sensitive substances, which maintain their viability, biological activity and other beneficial properties in the prepared food product. The present invention also relates to pasteurized food products containing biologically active high-pressure sensitive probiotics, other high-pressure sensitive substances, or their combinations.

26 Claims, 4 Drawing Sheets

Related U.S. Application Data continuation of application No. 16/733,929, filed on Jan. 3, 2020, now Pat. No. 10,966,440.

(60) Provisional application No. 62/788,830, filed on Jan. 5, 2019.

(51) Int. Cl.

| | | |
|---|---|---|
| A23B 70/00 | (2025.01) | |
| A23C 9/12 | (2006.01) | |
| A23C 9/127 | (2006.01) | |
| B65D 25/08 | (2006.01) | |
| B65D 81/32 | (2006.01) | |
| A23B 11/10 | (2025.01) | |

(52) U.S. Cl.
CPC ....... *B65D 25/082* (2013.01); *B65D 81/3216* (2013.01); *A23B 11/10* (2025.01); *A23V 2002/00* (2013.01)

(58) Field of Classification Search
CPC ..... A23L 3/0155; B65B 25/001; B65B 29/10; A61K 35/74; A61K 35/741; A61K 35/742; A61K 35/744; A61K 35/745; A61K 35/747
See application file for complete search history.

(56) References Cited

U.S. PATENT DOCUMENTS

| | | | | |
|---|---|---|---|---|
| 7,037,708 | B1* | 5/2006 | Runge | C12N 1/04 435/243 |
| 7,854,950 | B2 | 12/2010 | Carroll et al. | |
| 8,889,375 | B2* | 11/2014 | Isa | A61K 31/702 435/7.32 |
| 8,919,080 | B2* | 12/2014 | Richter | A23L 3/003 53/425 |
| 9,277,763 | B2 | 3/2016 | Beckman et al. | |
| 9,554,583 | B2* | 1/2017 | Hollard | A23L 33/135 |
| 11,337,926 | B2* | 5/2022 | Zhang | A61K 9/2054 |
| 2004/0048083 | A1 | 3/2004 | Bamore et al. | |
| 2005/0112252 | A1 | 5/2005 | Tewari | |
| 2013/0266699 | A1 | 10/2013 | Middis et al. | |
| 2014/0335227 | A1 | 11/2014 | Hollard et al. | |
| 2014/0370162 | A1* | 12/2014 | Vyas | B65D 81/3266 53/445 |
| 2015/0004293 | A1 | 1/2015 | Beckman et al. | |
| 2015/0028037 | A1 | 1/2015 | Porter | |

OTHER PUBLICATIONS

Park et al. Multiple-unit tablet of probiotic bacteria for improved storage stability, acid tolerability, and in vivo intestinal protective effect, published Apr. 7, 2016, https://www.ncbi.nlm.nih.gov/pmc/articles/PMC4827893/ (Year: 2016).*

International Search Report & Written Opinion, PCT Appl. No. PCT/US20/12193, dated Apr. 21, 2020, 23 pages.

Cangelosi, et al., "Dead or alive: molecular assessment of microbial viability," Appl Environ Microbiol. 2014;80(19):5884-91.

Emerson, et al., "Schrodinger's microbes: Tools for distinguishing the living from the dead in microbial ecosystems," Microbiome. Aug. 16, 2017;5(1):86.

Guidelines for the Validation of Analytical Methods for the Detection of Microbial Pathogens in Foods and Feeds. U.S. Food and Drug Administration Foods Program, Oct. 2019.

Jankowska, et al., "Effect of High Pressure on Microflora and Sensory Characteristics of Yoghurt," Pol J Food Nutr Sci 55(1): 79-84, 2005.

Laboratory Guidebook, Notice of Change, United States Department of Agriculture, Jun. 29, 2014.

Mackowiak, "Recycling Metchnikoff: probiotics, the intestinal microbiome and the quest for long life," Frontiers in Public Health, 1:52, 3 pages, 2013.

Podolsky, "Metchnikoff and the microbiome," The Lancet, 380(9856):1810-1811 (2012).

Reps, et al., "Effect of high pressures on *Streptococcus salivarius* subsp. Thermophiles," Milchwissenschaft. (2001) 56. 131-133.

Spiller, "Review article: probiotics and prebiotics in irritable bowel syndrome," Aliment Pharmacol Ther. 28(4):385-96, (2008).

"What are sporous probiotics," Probiotic Plus | Probiotics for animals, http://probiotic-plus.ru/blog/chto-takoe-sporogennyie-probiotiki/, Nov. 15, 2011.

Venugopalan, et al., "Regulatory Oversight and Safety of Probiotic Use," Emerging Infectious Diseases, vol. 16, No. 11, pp. 1661-1665, Nov. 2010.

Young, et al., "Effects of interfacial composition on the stability of emulsion and encapsulated bioactives after thermal and high pressure processing," Journal of Food Engineering, vol. 231, pp. 22-29, 2018.

* cited by examiner

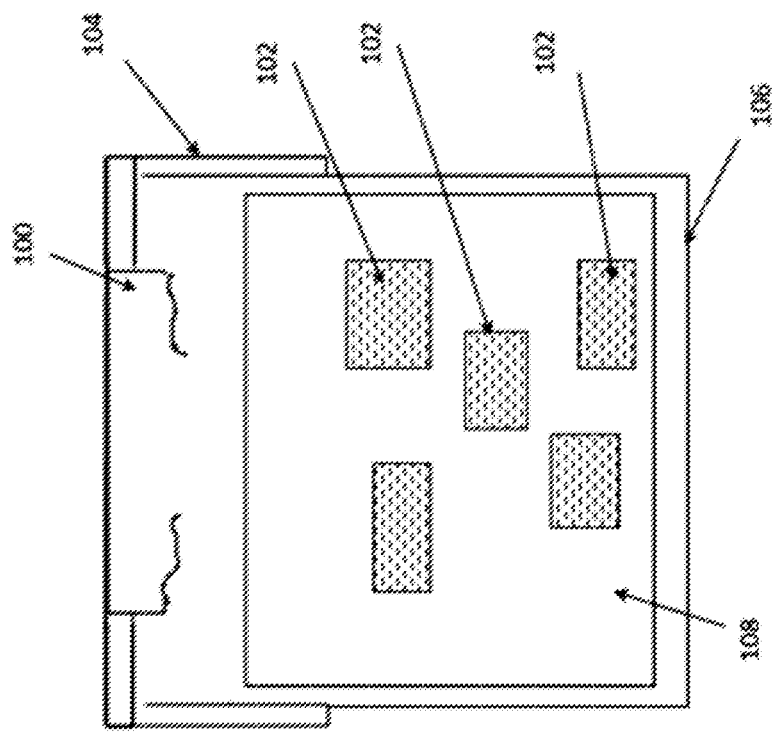
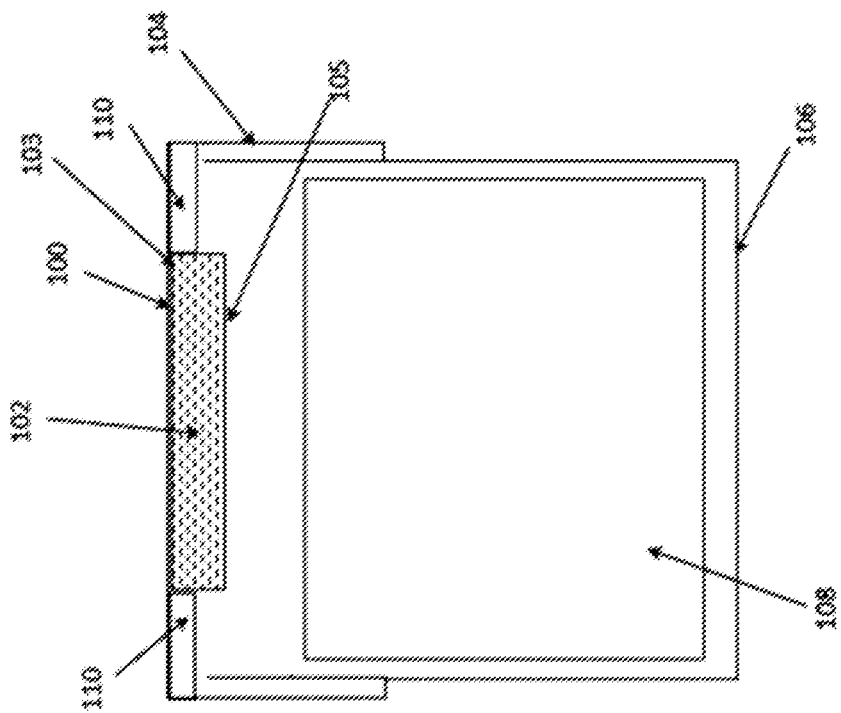

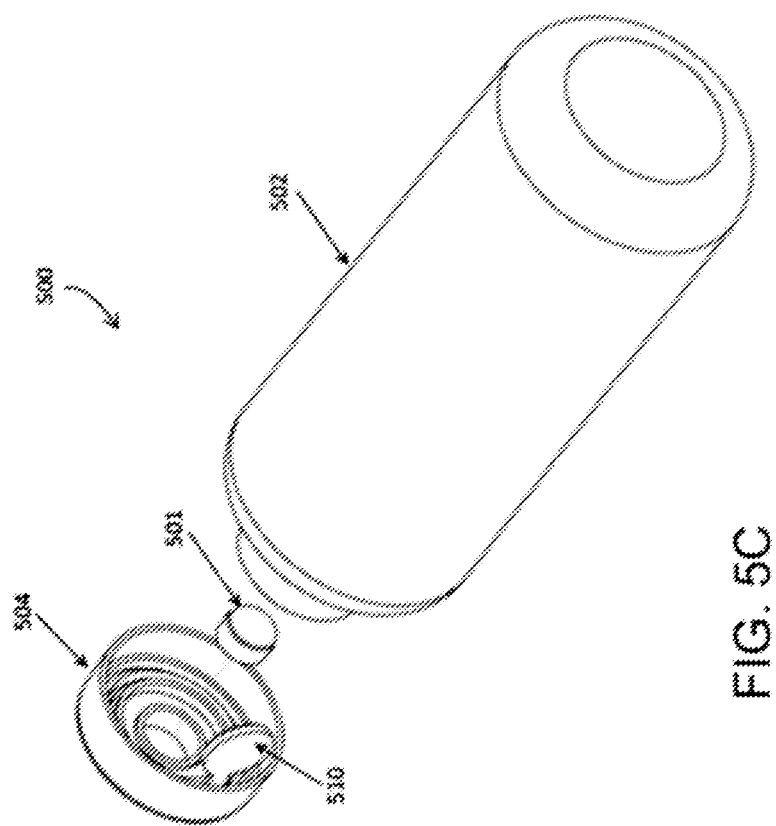
FIG. 5C
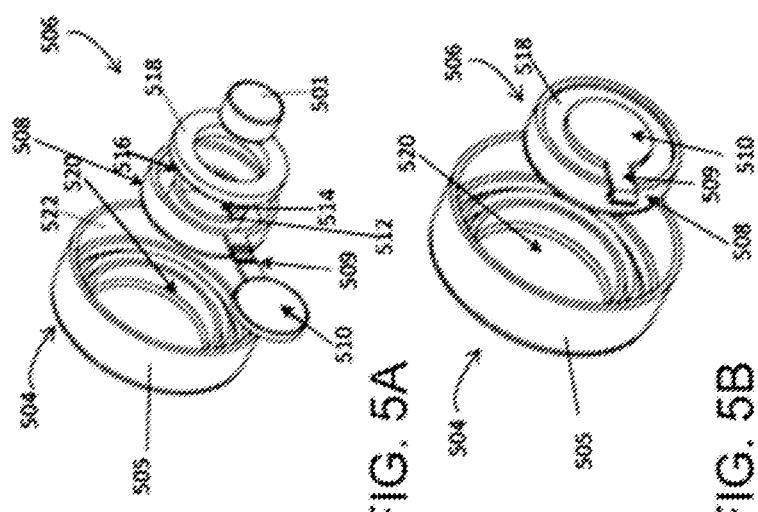
FIG. 5A
FIG. 5B

HIGH PRESSURE PROCESSING OF FOODS AND FOOD SUPPLEMENTS

PRIORITY

This application is a continuation of U.S. patent application Ser. No. 17/186,892, filed Feb. 26, 2021, which is a continuation of U.S. patent application Ser. No. 16/733,929, filed Jan. 3, 2020, and is now U.S. Pat. No. 10,966,440, which claims priority to and benefit from U.S. Provisional Patent Application Ser. No. 62/788,830, filed Jan. 5, 2019, the entire disclosure of each of these applications being incorporated herein by this specific reference.

TECHNICAL FIELD

The present invention relates generally to high pressure processing ("HPP") of foods (including beverages) and food supplements and, more particularly, methods of HPP of foods and food supplements containing probiotics (bacteria and/or yeasts) and their metabolites (including substances with anti-inflammatory, antibiotic, and/or other health-promoting activity), enzymes, prebiotics, nutraceuticals, and/or other biologically active substances that are sensitive to high pressure, and food packaging containers for such HPP. The present invention also relates to foods and food supplements pasteurized by HPP and containing probiotics and their metabolites, enzymes, prebiotics, nutraceuticals, and/or other biologically active substances sensitive to high pressure, which maintain their viability and biological activity after HPP. The foods prepared in accordance with HPP methods of the present invention include fermented foods and, in particular, lacto-fermented foods, including without limitation lacto-fermented juices, grains, herbal teas, lemonades, sodas, and dairy products.

BACKGROUND

The nutritional value of a food product (including a beverage), its safety, appearance and taste qualities influence consumers' preferences and purchase decisions. Thermal treatment methods, such as radio frequency, microwave, and infrared heating during processing, are commonly used to reduce, control or eliminate pathogens from food products and to extend food products' shelf life. However, such methods often affect nutrition and sensory properties (e.g., palatability) of the food. Moreover, heat treatment prevents the use of probiotics (bacteria and/or yeasts) and other heat-sensitive substances in foods and food supplements. Accordingly, as the food industry strives to meet consumer demand for fresh, minimally processed foods that have extended shelf life, the demand for non-thermal processing technology increases. High pressure processing (HPP) thus becomes a way of choice to pasteurize or sterilize food under high pressure to inactivate or destroy pathogens without changing natural status of the food during the process. In HPP, high pressure kills microorganisms by interrupting their cellular function without the use of heat and, thus, without changing the taste, texture and nutrition of the food. The HPP method, however, is not suitable for pasteurization of foods and nutritional supplements containing high-pressure-sensitive ingredients.

Accordingly, there is a need for improved techniques for preparation, packaging, and pasteurization of foods and nutritional supplements, especially, foods and nutritional supplements containing probiotics (bacteria and/or yeasts) and their metabolites, enzymes, prebiotics, nutraceuticals, and/or other biologically active substances that are sensitive to high pressure.

SUMMARY OF THE INVENTION

Accordingly, in various aspects, the present invention is directed to a method for preparation of foods (including beverages) and food supplements using HPP, wherein the food products or supplements can include high-pressure sensitive ingredients, such as, e.g., probiotics (bacteria and/or yeasts), enzymes, prebiotics, nutraceuticals, and other biologically active substances. The described methods allow performing food preservation (e.g., food sterilization or pasteurization) using HPP in the manner that maintains the viability, activity, and/or other beneficial properties of such high-pressure sensitive ingredients.

In some embodiments, prior to treatment of a food product using HPP, at least one additional high-pressure sensitive substance, in a dry form, can be included in a food packaging container with the food product, such that the dry additional substance remains dry or substantially dry during the time period HPP is performed. In some embodiments, the dry additional substance is protected from moisture in the food product by a barrier and remains dry during HPP. In some other embodiments, the dry additional substance is compressed to form a tight block. The outer layer of such block prevents moisture penetration into the inner layers of the block during HPP. Such a block of the dry additional substance remains substantially dry during HPP with only outer layer of the block being exposed to moisture. In this way, the high pressure applied during HPP results in preservation of the food product while not destroying the biological activity (e.g., viability, number of colony-forming units ("CFU"), and/or immunostimulatory activity) of the additional substance.

The above-referenced barrier can have various configurations, sizes, and shapes, and it can be a two- or three-dimensional barrier formed from suitable material(s). The barrier is disposed within the food packaging container such that the barrier does not affect the food product or consumer acceptability of the food product. In some embodiments, the barrier is in the form of an enclosure disposed within the food packaging container and coupled to a certain part (e.g., a cover or other part or area) of the food packaging container. Further, in some embodiments, the dry additional substance disposed within the enclosure can itself be encapsulated, e.g., in a capsule, tablet, caplet, etc. The encapsulation can provide an additional barrier to moisture and other agents within the food product. The material for encapsulation is selected such that it retains its integrity and moisture impermeability at least during HPP. In some embodiments, however, the dry additional substance disposed within the enclosure is not additionally encapsulated.

In some embodiments, the encapsulation of the additional substance (e.g., within a capsule, caplet, vial, etc.) is the only barrier against the environment within the food packaging container, and no additional enclosure is present.

The dry additional substance can be disposed within the food packaging container such that the barrier can at least partially break, disintegrate, or otherwise change its configuration during or after HPP so as to release the additional substance into the interior of the food packaging container. However, the dry additional substance comes at least partially in contact with the food product only after HPP is completed (i.e., the dry additional substance remains dry or substantially dry during HPP). For example, the encapsulated dry additional substance can be released during HPP while the dry additional substance remains protected from the moisture in the food product during HPP by the encapsulation. After HPP, the capsule's shell disintegrates and releases the dry additional substance into the food product thereby forming a final consumer food product (i.e., a food product to be sold to consumers). On the other hand, the dry additional substance in a loose powder form can be released into the interior of the food packaging container and can contact the food product only after HPP is completed, to avoid exposure to the moisture in the food product during HPP.

In one aspect, a method of preparation of a food product is provided that in some embodiments includes placing at least one additional substance capable of conferring a health benefit to a subject in the vicinity of the food product that is disposed within an interior of a food packaging container, wherein the additional substance is in a dry form and is separated from the food product by a barrier. The method further includes applying high pressure to the food packaging container including the food product such that the capability of the additional substance to confer the health benefit to the subject is maintained, wherein the barrier is configured to at least partially break to thereby release the additional substance into the interior of the container, and wherein the additional substance remains substantially in the dry form until a completion of the application of the high pressure.

In another aspect, a method of preparation of a food product is provided that in some embodiments includes placing at least one substance having biological activity into a packaging container including a food product, wherein the substance is in a dry form and is separated from the food product by a barrier. The method further includes applying HPP to the packaging container to thereby perform pasteurization of the food product included therein, while maintaining the biological activity of the substance, wherein the barrier is configured to change its configuration to thereby release the substance into the packaging container such that the substance is brought in contact with the food product. The substance remains substantially in the dry form until a completion of the application of HPP.

In yet another aspect, a food packaging container is provided that in some embodiments includes a first enclosed area and a second enclosed area. The first enclosed area of the packaging container can have a food product disposed therein, the packaging container being suitable for application of high pressure processing (HPP) thereto. The second enclosed area of the packaging container can have an interior separated from the first enclosed area by a barrier, wherein the interior releasably includes at least one substance having biological activity in a dry form. The food packaging container also includes at least one feature in a first configuration that is configured to change from the first configuration to a second configuration to thereby cause the substance be released from the interior of the second enclosed area into the first enclosed area.

In still another aspect, a food product is provided that includes a sealed packaging container, at least one edible ingredient, and at least one additional substance having biological activity. The at least one edible ingredient is enclosed within the packaging container and cold-pasteurized using HPP comprising application of high pressure to cause deactivation or elimination of at least one pathogenic microorganism in the edible ingredient. The at least one additional substance is also enclosed within the packaging container comprising one or more of a probiotic (bacteria and/or yeasts), prebiotic, enzyme, and nutraceutical, wherein the at least one additional substance underwent HPP in a dry form while disposed within the packaging container, and wherein the additional substance maintained the biological activity after the HPP at a suitable level.

In some embodiments, the suitable level of biological activity is the level of biological activity after HPP that is substantially the same as the level of biological activity prior to HPP. In other embodiments, the suitable level of biological activity after HPP is at least 90%, at least 80%, at least 70%, at least 60%, or at least 50% of the original (i.e., prior to HPP) viability and/or activity of the additional substance. The viability and/or activity can be measured, e.g., in colony-forming units. In some embodiments, wherein maintaining the capability of the additional substance to confer the health benefit to the subject comprises maintaining at least 99%, at least 98%, at least 97%, at least 96%, at least 95%, at least 94%, at least 93%, at least 92%, at least 91%, at least 90%, at least 80%, at least 70%, at least 60%, or at least 50% of the original (i.e., prior to HPP) number of colony-forming units of the additional substance after HPP. For the purposes of the instant disclosure, the biological activity both "after HPP" and "prior to HPP" is the biological activity of the additional substance after it is mixed with the edible ingredient and thereby rehydrated. The mixing and rehydration occur after HPP to determine the biological activity "after HPP." The mixing and rehydration occur without HPP (or prior to HPP) to determine the biological activity "prior to HPP."

In yet another aspect, a method of preparing a pasteurized fermented food product is provided that includes obtaining a probiotic food product that is enclosed within a packaging container, the probiotic food product containing a probiotic culture, comprising microorganisms (including bacteria and/or yeast) that are at least partially in a dormant state and are not reproducing, mixed with a food ingredient (liquid food ingredient or semi-solid food ingredient containing moisture), wherein the probiotic food product is obtained by HPP applied to the packaging container containing the food ingredient and the probiotic culture in a dry form. The method further includes exposing the packaging container with the probiotic food product included therein to an elevated incubation temperature for a predetermined period of time to thereby cause the probiotic food product to become a fermented food product, wherein the exposure of the probiotic food product to the elevated temperature causes microorganism in the probiotic culture to transition from the dormant state into a reproducing state.

In some aspects, a method of HPP of a food product in a food packaging container is provided that comprises obtaining a food packaging container comprising a food product within an interior of the food packaging container and at least one additional substance having a biological activity, wherein the at least one additional substance has an HPP-resistant form. The method further comprises subjecting the food packaging container to HPP, while maintaining the at least one additional substance in the HPP-resistant form.

The food product can be any suitable type of a food product that can be treated using HPP. For example, in some embodiments, the food product comprises a juice. In some embodiments, the food product comprises a dairy product.

The food packaging container can be subjected to HPP for a period of time of from about 1 minute to about 15 minutes, or for any other suitable period of time.

In some embodiments, the additional substance is one or more of probiotics, prebiotics, bacteria, yeasts, microbial metabolites, enzymes, or nutraceuticals. The probiotics may comprise at least one probiotic species selected from the group consisting of *Streptococcus thermophilus, Lactobacillus bulgaricus, L. acidophilus, L. lactis, L. casei, L. paracasei, L. brevis, L. plantarum, L. rhamnosus, L. fermentum, L. salivarius, L. caucasicus, L. helveticus, L. reuteri, L. johnsonii, L. grasseri, Bifidobacterium bifidum, B. infantis, B. longum, B. thermophilum, Saccharomyces boulardii, Bacillus subtilis, B. lichenformis, Enterococcus faecium*, and *Propionibacterium jensenii*.

In some embodiments, the at least one probiotic species maintains its viability during HPP and, after HPP is completed, has a biological activity comparable to the biological activity it has without or in the absence of HPP. In some embodiments, after HPP is completed, the at least one probiotic species produces at least 50% of the number of colony-forming units it was capable of producing before or in the absence of HPP In the described method, in some embodiments, the at least one additional substance has an HPP-resistant form, which can be any suitable form, including a combination of forms. Thus, in some embodiments, the HPP-resistant form can be one or more of dry, frozen, compressed, compacted, porous, carbonated solution, and carbonated suspension forms. In some embodiments, the HPP-resistant form of the at least one additional substance is an ice block, which can have any suitable size and shape. In some embodiments, the HPP-resistant form of the at least one additional substance is a compressed block, which can have any suitable size and shape.

In some embodiments, the HPP-resistant form of the at least one additional substance is a dry form and the at least one additional substance is separated from the food product by a barrier during HPP. The barrier can be of any suitable type. For example, in some embodiments, the barrier can comprise a coating releasably encapsulating the at least one additional substance and keeping it dry during HPP.

In some embodiments, the at least one additional substance is in a form of a capsule, microcapsule, or caplet.

In some embodiments, the described method of HPP of a food product in a food packaging container further comprises bringing the at least one additional substance in contact with the food product upon completion of HPP.

In some aspects, a method of HPP of a food product in a food packaging container is provided that comprises obtaining a food packaging container comprising a food product within an interior of the food packaging container and at least one additional substance having a biological activity, wherein the at least one additional substance is in a dry form and is separated from the food product by a barrier; and subjecting the food packaging container to HPP while maintaining the at least one additional substance substantially dry during at least a portion of HPP. The barrier can be designed to change its configuration thereby releasing the at least one additional substance into the food packaging container such that the at least one additional substance is brought in contact with the food product.

The change of the configuration of the barrier can be triggered in various ways. For example, in some embodiments, the change of the configuration of the barrier is caused by a pressure exerted on the food packaging container during HPP. In some embodiments, the change of the configuration of the barrier is caused by a release of a pressure exerted on the food packaging after completion of HPP. In some embodiments, the change of the configuration of the barrier requires an action by a consumer (e.g., consumer pulls a tab or turns the cover).

In some embodiments, the barrier is an enclosure configured to releasably hold the at least one additional substance separate from the food product at least during a portion of HPP.

The food packaging container can have various configurations that allow maintaining the at least one additional substance substantially dry during at least a portion of HPP. For example, in some embodiments, the food packaging container comprises a container body having a cavity and a removable cover, wherein the food product is disposed within the cavity of the container body, and the enclosure with the at least one additional substance is disposed within the cover. The enclosure can be removably or non-removably coupled to the cover.

In some embodiments, the barrier changes its configuration by at least partially breaking upon completion of HPP thereby releasing the at least one additional substance into the interior of the sealed packaging container.

In some embodiments, the enclosure includes a feature that is configured to change its configuration after HPP is completed to release the at least one additional substance into the food packaging container. In an embodiment, the feature can be a valve, wherein the valve remains closed during HPP and wherein the valve opens when the high pressure of HPP is released.

In some aspects, a method of preparing a pasteurized fermented food product is provided that comprises obtaining a closed food packaging container comprising a food product within an interior of the food packaging container and a dry probiotic culture comprising at least one microbiological strain; subjecting the closed food packaging container to HPP, while maintaining the probiotic culture in a substantially dry form at least during a portion of HPP; inoculating the food product with the probiotic culture within the closed food packaging container; and exposing the food packaging container with the pasteurized probiotic food product to an elevated temperature for a period of time sufficient to form at least partially fermented food product within the closed food packaging container.

In some embodiments, a method of preparing a pasteurized fermented food product is provided that comprises obtaining a closed food packaging container comprising a food product within an interior of the food packaging container and a probiotic culture comprising at least one microbiological strain, wherein the closed food packaging container was subjected to HPP such that the probiotic culture was maintained in a substantially dry form during at least a portion of HPP. The method further comprises inoculating the food product with the probiotic culture within the closed food packaging container; and exposing the food packaging container with the pasteurized probiotic food product to an elevated temperature for a period of time sufficient to form at least partially fermented food product within the closed food packaging container.

In some embodiments, HPP of the food packaging container, inoculation of the food product with the probiotic culture, and exposing the food packaging container with the pasteurized probiotic food product to an elevated temperature is performed in the closed food packaging container.

In some embodiments, the probiotic culture is maintained in the substantially dry form until HPP is completed. The inoculating step can comprise bringing the probiotic culture in contact with the food product whereby at least partially rehydrating the probiotic culture and forming a pasteurized probiotic food product enclosed within the closed food packaging container.

In some embodiments, the at least one microbiological strain is one or more strains selected from the group consisting of *Lactobacillus* spp., *Bifidobacterium* spp., and *Saccharomyces* spp.

In some embodiments, the elevated temperature is between about 38° C. to about 46° C. The packaging container can be exposed to the elevated temperature for from about 3 hours to about 24 hours.

In some aspects, a food product comprising at least one additional substance having a biological activity is provided, wherein the food product can be prepared any other methods described above.

In some aspects, the food product is a pasteurized fermented food product prepared in accordance with the methods of preparing a pasteurized fermented food product, in accordance with various embodiments of the present disclosure. The pasteurized fermented food product can be a lacto-fermented food product selected from the group consisting of lacto-fermented yogurt, kefir, cheese, juice, tea, kvass, lemonade, and soda.

BRIEF DESCRIPTION OF THE DRAWINGS

Various features, objects, and advantages of the present invention will be described in connection with the accompanying drawings, which are incorporated in and constitute a part of this disclosure. The drawings illustrate exemplary embodiments of the invention and do not therefore limit its scope. In the drawings:

FIG. 1A is a cross-sectional view of an example of a system in which some embodiments can be implemented;

FIG. 1B is a cross-sectional view of an example of the system of FIG. 1A after high pressure processing was applied;

FIG. 5A is a perspective, partially exploded view of an example of a cap assembly with a valve and a biologically active substance, in accordance with some embodiments;

FIG. 5B is perspective, partially exploded view of the cap assembly of FIG. 5A, showing the valve closed, in accordance with some embodiments; and FIG. 5C is a perspective, partially exploded view of a food packaging container assembly and the cap assembly of FIG. 5A with the valve open.

DETAILED DESCRIPTION

Figure 2:
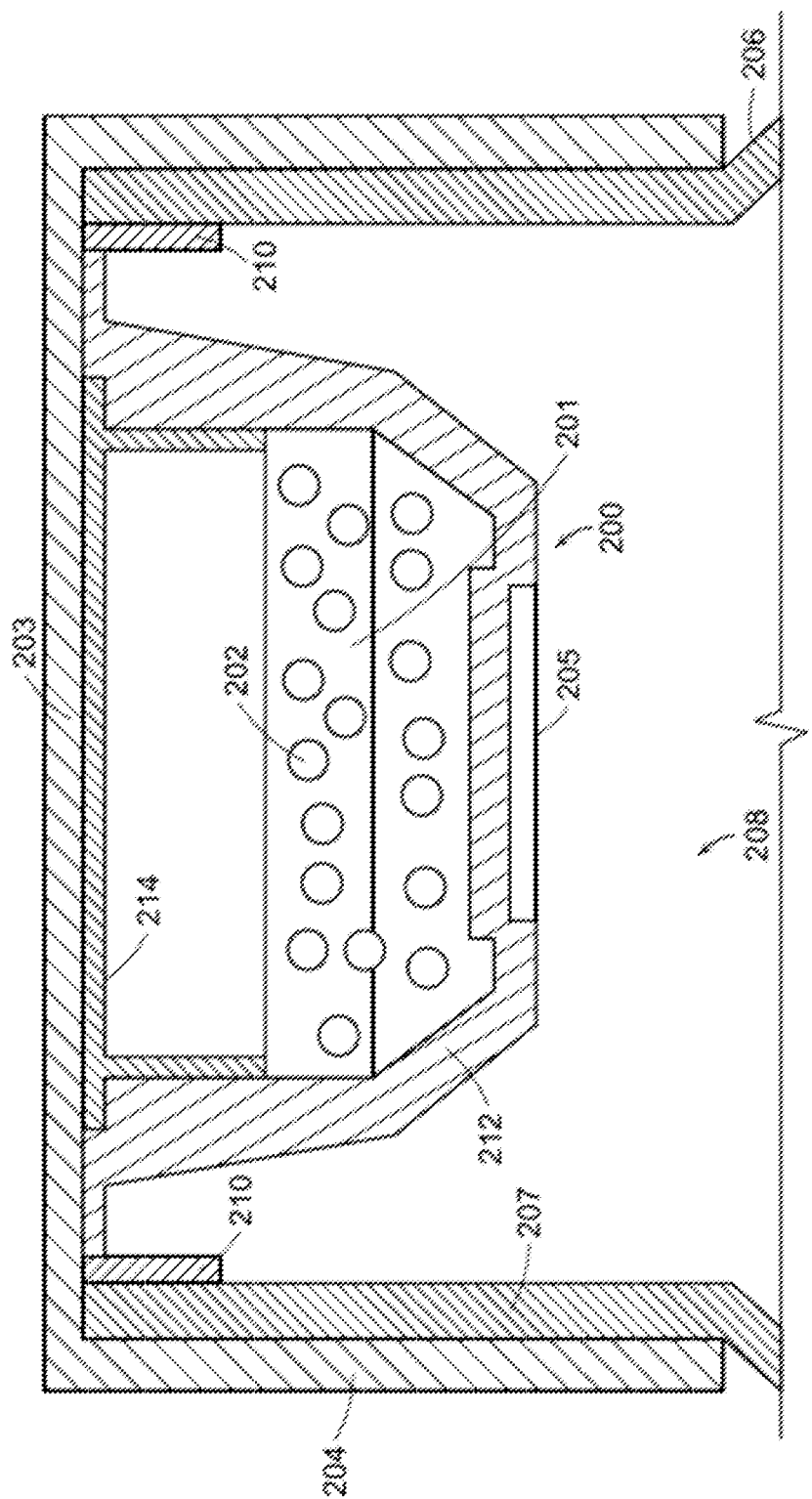
FIG. 2 is a cross-sectional view of another example of a system in which some embodiments can be implemented.

High pressure processing ("HPP") uses high pressure to eliminate or greatly reduce number of pathogenic microorganisms in foods and food supplements (collectively referred to herein as a "food product" or "food"). For the purposes of this disclosure, terms "food product" and "food" broadly include solid foods (e.g., cheese, marinated products, seafood, meat), semi-solid foods (e.g., yogurt, jam, sauces, puree), beverages (e.g., fruit juices, dairy products, smoothies, bioactive beverages), and any combination of food products, including food products of different types. For purposes of the present invention, a "food product" refers to edible product(s) that can be pasteurized by HPP. A person of skill in the art would know which products can be treated using HPP and how to select appropriate HPP treatment conditions. Thus, solid foods that can be processed using HPP in accordance with embodiments of the present disclosure are types of solid foods that include some moisture and are known to be treatable by HPP.

In conventional applications, the high pressure applied to a food product during HPP negatively affects not only viability of pathogenic microorganisms, but also viability of probiotics (i.e., beneficial bacteria and/or yeasts) and their metabolites in the food product. High pressure also affects biological activity of other high-pressure sensitive substances, such as enzymes, prebiotics, and/or nutraceuticals (collectively, "high-pressure-sensitive substances").

The inventors have unexpectedly discovered that the damaging effects of HPP on high-pressure-sensitive substances can be prevented by maintaining such substances in an HPP-resistant form during HPP. For the purposes of this disclosure, high-pressure-sensitive substances are HPP-resistant if they are maintained during HPP in a form that minimizes effects of pressure on their biological activity after the exposure to HPP. For example, high-pressure-sensitive substances are HPP-resistant if they are maintained in dry, frozen, compressed, and/or compacted form during HPP. High-pressure-sensitive substances are also HPP-resistant if they are dissolved in sparkling water or formed into a porous material before HPP. High-pressure-sensitive substances are also HPP-resistant if they are protected during HPP by a barrier or a protective layer. Accordingly, in the embodiments of the present disclosure, HPP of a food packaging container with a food product and one or more high-pressure-sensitive substances produces differential results: 1) the food product undergoes the HPP treatment, which controls or eliminates pathogens from the food product while 2) the biological properties of the high-pressure-sensitive substances (such as, for example, viability and activity of probiotic microorganisms) are not affected by HPP.

Accordingly, the present invention provides a method for application of HPP to preparation of foods containing high-pressure-sensitive substances. In some embodiments, high-pressure-sensitive substances in an HPP-resistant form are added to the packaging container with a food product and the container is sealed or securely closed. During HPP, high-pressure-sensitive substances remain in their HPP-resistant form within the closed container, while the food product within the same container undergoes HPP. After HPP is completed, high-pressure-sensitive substances are mixed with the pasteurized food product within the closed container. As a result, a pasteurized product containing both food product and active high-pressure-sensitive substances is obtained. Thus, food products subjected to HPP in accordance with the methods of the instant invention keep food safe and extend their shelf life, while maintaining biological activity of high-pressure substantives added to the food product before HPP. With respects to probiotics, the instant invention allows the probiotic cultures to withstand HPP and return to their normal viability and metabolic activity after HPP is completed.

In some embodiments, a method of HPP of a food product in a food packaging container is provided that comprises obtaining a food packaging container comprising a food product within an interior of the food packaging container and at least one additional substance having a biological activity, wherein the at least one additional substance has an HPP-resistant form. In some embodiments, the at least one additional substance (e.g., one or more of probiotics, prebiotics, bacteria, yeasts, microbial metabolites, enzymes, nutraceuticals, etc.) can also be disposed in the same portion of the interior of the food packaging container as the food product. In some embodiments, the at least one additional substance can be disposed in a cover (e.g., a cap or another element) that is configured to be coupled to the food packaging container to seal it.

The method further comprises subjecting the food packaging container to HPP, while maintaining the at least one additional substance in the HPP-resistant form. The food product can be placed in the food packaging container at a same location where the food packaging container undergoes HPP. In some embodiments, the food product is placed in the food packaging container at a location that is different from a location where the food packaging container is subjected to HPP. The at least one additional substance can be placed into the food packaging container at the same location where the food product is placed in the food packaging container (e.g., in a manufacturing and/or packaging facility), such that the food product and the at least one additional substance are included in the final (consumer-ready) packaging before the food product is subjected to HPP.

HPP is a food preservation method that inactivates food-borne pathogens and spoilage organisms and prevents their growth in the food product. Thus, if the food product contains one or more pathogenic and/or spoilage microorganisms, HPP can reduce a number of such microorganisms such that the food product is safe for consumer consumption and has an extended shelf life or can eliminate the undesirable microorganisms. Non-limiting examples of food products that can undergo HPP in accordance with the methods of the instant invention comprise one or more of solid foods, semi-solid foods, beverages, and food supplements. In some embodiments, the food product is a juice or a dairy product. Those skilled in the art would appreciate that the effectiveness of the HPP process depends on the amount of pressure applied, vessel holding time, temperature, product type and targeted pathogens and spoilage organisms and would be able to select appropriate HPP parameters.

In some embodiments, the food packaging container is subjected to HPP for a period of time of from about 1 minute to about 15 minutes.

In some embodiments, the at least one additional substance comprises probiotics comprising at least one probiotic species non-limiting examples of which include one or more of *Streptococcus thermophilus, Lactobacillus bulgaricus, L. acidophilus, L. lactis, L. casei, L. paracasei, L. brevis, L. plantarum, L. rhamnosus, L. fermentum, L. salivarius, L. caucasicus, L. helveticus, L. reuteri, L. johnsonii, L. grasseri, Bifidobacterium bifidum, B. infantis, B. longum, B. thermophilum, Saccharomyces boulardii, Bacillus subtilis, B. lichenformis, Enterococcus faecium*, and *Propionibacterium jensenii*.

In accordance with embodiments of the present disclosure, the at least one probiotic species maintains its viability during HPP and, after HPP is completed, has a biological activity comparable to the biological activity it has without or in the absence of HPP. In some embodiments, after HPP is completed, the at least one probiotic species produces at least 50% of the number of colony-forming units it was capable of producing before or in the absence of HPP.

As used herein, "a probiotic" or "a probiotic culture" is defined as any living microorganism or a mixture of living microorganisms (or their bi-products) that, when administered to a human or other mammal subject in adequate amounts, confer a certain health benefit to the subject (i.e., the host). The probiotic may include at least one living bacterium, at least one yeast species, or any combination thereof. Probiotics can include a single probiotic species or multiple probiotic species. Probiotic species may comprise single or multiple strains. Probiotics are known to activate immune system of the host, provide gastrointestinal benefit to the host, inhibit the growth and activity of putrefying or other harmful bacteria, and to confer other benefits to the host. Clinical and basic investigations on probiotics have used a multitude of probiotic species, both as single strains and multi-strain and/or multi-species products. In some embodiments, probiotics include *Lactobacillus* species.

As used herein, "a prebiotic" is a compound in food that induce the growth or activity of beneficial microorganisms such as bacteria and yeasts. The most common example is in the gastrointestinal tract, where prebiotics can alter the composition of organisms in the gut microbiome.

As used herein, "HPP" refers to a cold pasteurization method by which products, typically sealed in their final package in which they are sold to consumers (i.e., "consumer-ready package"), are introduced into an HPP system and subjected to a high level of isostatic pressure (i.e., a uniform pressure from every direction) transmitted by water (hydrostatic pressure). The pressure is from about 100 MPa to about 1000 MPa and to kills hazardous pathogenic microorganisms by interrupting their cellular function. In some embodiments in accordance with the present disclosure, HPP is conducted using a pressure from about 300 MPa to about 650 MPa, and, more preferably, between about 500 MPa and about 650 MPa. Majority of microorganisms cannot withstand the pressure above about 300 MPa (some microorganisms are even more high-pressure-sensitive). Accordingly, pressures above 300 MPa at cold (+4° C. to 10° C.) or ambient temperature are commonly used in the food industry to inactivate the vegetative flora (bacteria, virus, yeasts, molds and parasites) present in food, extend the products shelf life and guarantee food safety.

As used herein, "viability" of a probiotic (or a probiotic culture or a probiotic species) refers to capacity of microbial cells in the probiotic to form progeny. Viability of microbial cells in a probiotic, probiotic culture or probiotic species can be determined using any suitable technique(s) known to those skilled in the art. For example, the viability can be determined using molecular viability analyses (e.g., Polymerase Chain Reaction-based techniques), or using other approaches that allow detecting viable microorganisms. See, e.g., Cangelosi et al., Dead or alive: molecular assessment of microbial viability. Appl Environ Microbiol. 2014; 80(19): 5884-91; Emerson et al., Schrödinger's microbes: Tools for distinguishing the living from the dead in microbial ecosystems. Microbiome. 2017 Aug. 16; 5(1):86. In some embodiments, a colony-forming units can be a measure of viable microorganisms. See, e.g., United States Department of Agriculture. Laboratory Quality Assurance Division. Laboratory guidebook. Washington, D.C.: United States Department of Agriculture; 2008. pp. 1-8.

Compared to other pasteurization methods, the advantage of HPP is that, while it can inactivate and even eliminate pathogenic microorganisms, it also allows preserving the "fresh" taste, flavor, quality, texture, and other sensory and organoleptic properties of a food product. Another advantage of HPP is that the processing can be performed within a relatively short period of time and while a food product is in the final, consumer-ready, package. This eliminates the likelihood of a secondary contamination of the food product, which leads to a more extended shelf-life as compared to that of food products that are packaged after thermal processing.

The amount of pressure applied and the duration of the application of HPP are selected so as to ensure pasteurization of the food or food supplement. For example, an automated HPP system may involve placing a packaged product into a handling basket that is placed into a vessel in which high isostatic pressure of about 300-900 MPa is applied, which allows killing most of the pathogenic microorganisms which can inseminate foods. Packaged food may be pressurized for a certain duration of time, taken out of the chamber and stored or distributed as usual. Examples of application of HPP in food preparation are described in WO 2017054052, U.S. Pat. No. 7,854,950, WO 2014209912, each of which is hereby incorporated herein by reference in its entirety. However, HPP limits the use of many effective probiotic cultures (bacteria and/or yeasts) and other biologically active substances in nutritional supplements and food products pasteurized using HPP due to their sensitivity to high pressure.

For a food product to be considered "probiotic," it should include life, active, and beneficial for human body cultures such as, e.g., bacteria and/or yeasts. At the same time, preserving the probiotic in a food product in the amount that still confers the health benefit of the probiotic is problematic when the food product is pasteurized using HPP. In particular, many microorganisms do not survive the high pressure treatment. For example, the high pressure treatment of about 400 MPa may reduce the amount of *Streptococcus thermophilus* by about two orders of magnitude, and may completely eliminate *Lactobacillus bulgaricus*. See Reps et al. (2001). Effect of high pressures on *Streptococcus salivarius* subsp. *thermophilus*. Milchwissenschaft. 56, 131-133; see also Jankowska et al. (2005) Effect of high pressure on microflora and sensory characteristics of yogurt. Pol J Food Nutr Sci 55(1):79-84. However, these microorganisms are incorporated into many probiotic products (e.g., bacteria and/or yeasts), because they are known to strengthen immune system by, among other things, stimulating production of interferon, immunoglobulins, cytokines, and increase phagocytosis. Indeed, Ilya Metchnikoff, a professor at the Pasteur Institute in Paris, attributed the longevity of the Balkan residents to their regular consumption of foods fermented using *Lactobacillus bulgaricus*, and postulated unique immunostimulatory and other health-improving properties of this bacterium. See Mackowiak (2013) Recycling Metchnikoff: Probiotics, the Intestinal Microbiome and the Quest for Long Life. Frontiers in Public Health. 1:52; Podolsky (2012) Metchnikoff and the microbiome. The Lancet. 380(9856):1810-1811. In the digestive tract, together with *S. thermophilus, L. bulgaricus* stimulates activation and growth of bifidobacteria, which has been associated with the host of health benefits (e.g., vitamin synthesis, improved immunity and digestion), especially, in children. Along with *L. bulgaricus, L. acidophilus* is also an important constituent of many probiotics. Acidophilic lactobateria do not initiate or stimulate any pathological processes in a human body, which is another reason for their use as probiotics.

*Lactobacillus acidophilus* is associated with various beneficial biological and physiological effects. For example, the strain *Lactobacillus acidophilus* n.v. Ep 317/402 "Narine" AAA deposited in the All-Russian Collection of Industrial Microorganisms (ARCIM) V-7747 and in the Collection of Microorganism Cultures of SSC "Vektor" (No. V-741), described in European Pat. No. EP1186654B1 the entire content of which is incorporated by reference herein, has complex anti-inflammatory properties, activates phagocytosis, neutralizes toxins, boosts production of interferon (which is associated with the antiviral and anticancer activity), and in general facilitates activation of the immune system. Nevertheless, despite the unique properties of this strain, because of its low tolerance to high pressure, it is typically not included in probiotic supplements and food products that are processed using HPP.

Techniques have been described (e.g., in U.S. Pat. No. 7,854,950, which is hereby incorporated herein by reference in its entirety) that include selecting appropriate microorganisms and strains that can withstand high pressure and remain viable after HPP. Such approach is however not without shortcomings—namely, the cultures are selected based on the ability to survive under high pressure, which can prevent selecting cultures based on their biological activity, benefits, safety, and proved effectiveness. This shortcoming becomes even more evident when it is desirable to use a mixture of symbiotic microorganisms but the microorganisms contained in the mixture have different levels of tolerance to high pressures.

Accordingly, the inventors have appreciated that what is needed is a method involving application of HPP to food products containing desired biologically active substances, such as, for example, probiotics (bacteria and/or yeasts), to eliminate or inactivate the sufficient amount of pathogenic microorganisms while substantially preserving viability of the probiotic culture (or another high-pressure-sensitive substance). In this regard, the inventors have discovered that at least one additional high-pressure-sensitive substance ("additional substance") such as a probiotic culture can maintain its viability and/or other original (and beneficial) properties after an HPP treatment if the additional substance remains in an HPP-resistant form during HPP and is mixed with the food product after HPP. In some embodiments, after HPP is completed, the additional substance and the food product are mixed within the sealed or closed packaging container.

In some embodiments, an HPP-resistant form is a dry or a substantially dry form, which remains dry or substantially dry during HPP treatment. This can be achieved by, for example, by placing the additional substance in a final (consumer-ready) package containing the food product, where the at least one additional substance is in a dry form. The dry form can be powder (which can be loose or pressed powder), granules, or other dry form. In some implementations, the additional substance can be encapsulated in a suitable manner, and non-limiting examples of encapsulating elements include a capsule, tablet, caplet, vial, microcapsule, etc. For example, the additional substance in the powder form can be encapsulated in one or more capsules. The additional substance in the dry form is capable of remaining in the dry form during application of high pressure.

The dry additional substance, which may or may not be encapsulated, can be disposed within the food packaging container including the food product such that the additional substance is separated from the food product by a barrier, which can be any suitable type of a barrier. In some embodiments, the barrier comprises an enclosure having the additional substance releasably contained therein. Additionally or alternatively, the barrier can be or can include a membrane, a coating releasably encapsulating the additional substance, or any other feature. Regardless of its specific configuration and other properties, the barrier can be a moisture barrier. In some embodiments, the additional substance in the dry form can be additionally encapsulated (using, e.g., a moisture-barrier capsule) and it can be included in an enclosure (serving as the barrier) in the encapsulated form.

In some embodiments, the barrier can be a hermetically sealed enclosure, such as a container cap with a cavity, pouch, pocket, capsule, packet, or another type of an enclosure, which can be sealable by a flap, valve, or another feature(s), and configured to releasably hold the additional substance separate from the food product during HPP. Regardless of its specific configuration, size, and position within the food packaging container, the enclosure provides a protective barrier that protects the additional substance from exposure to moisture and other agents within the environment inside the food packaging container. Also, the enclosure is configured such that it withstands the application of high pressure during an HPP treatment, though at least a portion of the enclosure can be breakable or otherwise changeable to release the dry additional substance retained within the enclosure at an appropriate time during or after HPP process as explained below.

The enclosure can have various suitable configurations. For example, in some embodiments, the enclosure is configured to at least partially break or open during the application of the high pressure to thereby release the additional substance into the interior of the container. The enclosure can be configured to at least partially break or open within a certain time period prior to completion of the application of the high pressure, wherein the time period comprises about 5 minutes, about 3 minutes, about 2 minutes, about 1 minute, about 30 seconds, about 20 seconds, about 10 seconds, about 5 seconds, about 4 seconds, about 3 seconds, about 2 seconds, about 1 second, or less than about 1 second prior to the completion of the application of the high pressure.

In other embodiments, the enclosure is configured to at least partially break after the application of the high pressure to thereby release the additional substance into the interior of the container. The enclosure can be configured to at least partially break within a certain time period after completion of the application of the high pressure, wherein the time period comprises about 5 minutes, about 3 minutes, about 2 minutes, about 1 minute, about 30 seconds, about 20 seconds, about 10 seconds, about 5 seconds, about 4 seconds, about 3 seconds, about 2 seconds, about 1 second, or less than about 1 second after the completion of the application of the high pressure.

In some other embodiments, the additional substance can be protected from high pressure of HPP by encapsulation. Specifically, the additional substance, in the form of a powder (loose or compressed), granules, etc., is encapsulated within a capsule, caplet, vial, microcapsule, or any other encapsulating element to preserve the additional substance in dry form during the application of high pressure.

In some embodiments, the additional substance can be encapsulated by being coated with a suitable material. The coating can be continuous, or partially continuous. The coating can be applied using spray-drying, compression coating, or another process. The protective coating can be formed using one or more materials having barrier properties including, e.g., low permeability to moisture and low solubility in water. Thus, the material is water-resistant (i.e., does not dissolve during HPP). The coating material should also be suitable for digestion. Examples of such materials include alginate, calcium alginate, chitosan, whey protein, xanthan gum, carrageenan, alginate-polylysine-alginate, alginate-chitosan-alginate, and various other natural biopolymers. In some embodiments, the outer layer can be made from an edible material that improves the taste of the finished product. Non-limiting examples of such edible material include a dried fruit juice (e.g., powder), a dried yogurt, a polysaccharide, or another edible material that can be applied as a protective layer.

In some embodiments, the encapsulation can be the only barrier that protects the additional substance during HPP. In such embodiments, the encapsulation ensures that the additional substance remains substantially in the dry form throughout the exposure of the additional substance to high pressure during HPP. For example, an encapsulating element can be configured such that it begins to dissolve or disintegrate after about 20-30 minutes upon exposure to moisture, and such that this property is not affected by high pressure. In this way, because HPP is typically applied to a food product in its packaging container for less than 20 minutes, the encapsulation protects the additional substance from moisture during the entire HPP treatment.

In some embodiments, the capsule, coating layer(s), or another element having the additional substance encapsulated therein, can be further protected from exposure to moisture during HPP by being disposed within a sealed enclosure which is disposed within the food packaging container. The enclosure can have a size and configuration suitable for releasably holding the capsules (or other elements with the additional substance). In such embodiments, the one or more capsules or other elements within the enclosure may be similarly configured to provide additional protective barrier. In some implementations, however, because the outer enclosure provides the protective barrier, encapsulating elements that are more sensitive to moisture can be used.

Furthermore, in some embodiments in which the enclosure is used as the moisture and pressure barrier, the additional substance may be in a non-encapsulated form. In such embodiments, loose or pressed powder, granules, or other forms of the dry additional substance can be retained within the enclosure during HPP. Thus, in some embodiments, the additional substance is not released into the interior of the food packaging container, and is thus not exposed to moisture, until the completion of the exposure of the food packaging container (including both the food product and the additional substance separated from the food product by a barrier) to high pressure during HPP is completed.

In some embodiments, the additional substance can be compressed or compacted into structures of a certain size and shape, such that the dry probiotic culture can withstand the high pressure exposure during HPP. For example, the additional substance in a form of free-flowing dry powder can be compressed into pills, tablets, pellets, agglomerates, granules, blocks, briquettes, or other forms of any suitable sizes and shapes. The additional substance can be compressed to form a single compressed form (e.g., a block) or multiple compressed forms (e.g., pellets) with the same or different shapes and sizes. In some embodiments, the size of the compressed additional substance is in the range from about 1 mm to about 0.5 mm. In other embodiments, the size of the compressed additional substance is from about 1 mm to about 20 mm in its largest dimension. But any other sizes can be used. Regardless of the specific type, shape, and size, the additional substance is prepared to withstand the high pressure and to be resistant to moisture of the food product.

In one embodiment, the dry additional substance is in a compressed form, is not encapsulated and is released into the interior of the food packaging container before the completion of HPP. In this embodiment, the compressed form helps maintaining the additional substance in a substantially dry form. For example, the dry additional substance can be compressed to form a tight block of any suitable shape. The outer layer of such block prevents moisture penetration into the inner layers of the block during HPP. During HPP, only outer layer of the block of the additional substance is exposed to moisture. The internal portion of the additional substance remains substantially dry and is therefore not affected by the high pressure.

In some embodiments, the compressed additional substance does not disintegrate for at least about 15 minutes from a time when it is added to the container with the food product or from a time when HPP begins. In other embodiments, the compressed additional substance does not disintegrate for at least about 30 minutes, at least about 45 minutes, or at least about an hour from the time it is added to the container with the food product or from a time when HPP begins. The compressed additional substance can be prepared such that it begins to disintegrate and rehydrate inside the product container after the HPP has been completed due to exposure to moisture in the food product. When the additional substance is a probiotic, its exposure to the moisture contained within the food product allows the microorganism cells reconstitute and begin to reproduce. In embodiments in which the final food product is a fermented product, the properties of the dry compressed or compacted form of the probiotic culture are selected so as to allow the food product to ferment to produce a finished product.

When the additional substance is a probiotic culture, it can be dried by spray-drying, freeze-drying, extrusion, or another suitable process. In some embodiments, the dried probiotic culture is additionally compressed using any suitable compression technique, including HPP. In one embodiment, the probiotic culture is transformed into a compressed form by HPP. The pressure applied during the HPP from about 100 to about 650 MPa causes the probiotic culture in the dry form to compress into a cake, brick, block, briquette or another structure capable of withstanding moisture for a time period from about one hour to about one hour and twenty minutes. In another embodiment, the compressed probiotic culture is resistant to moisture of the food product at least during HPP. For example, the probiotic culture can retain its resistance to moisture for at least about 15 minutes, at least about 20 minutes, or at least about 30 minutes.

Regardless of the specific way in which the additional substance in the dry form is protected from moisture during HPP and regardless of a number and type(s) of barriers used (if any are used at all), the additional substance remains in a substantially dry form during exposure to high pressure of HPP. For the purposes of this disclosure, the additional substance is considered to remain in a "substantially" dry form when, even, if some exposure to moisture takes place (e.g., when the additional substance is mixed with a food product while HPP is undergoing), the additional substance retains its biological activity (e.g., viability, number of colony-forming units ("CFU"), and/or immunostimulatory activity) and the ability to confer a health benefit to a subject. For example, the additional substance comprising microorganisms retains its viability such that, after HPP is completed and upon rehydration of the additional substance, the microorganisms can reproduce and form sufficient number of CFU to make the food product with the additional substance beneficial to the consumer.

In some embodiments, the additional substance is added to the container with a food product in a frozen form. In one embodiment, the additional substance is in a form of an ice block. In some embodiments, the additional substance is a probiotic culture frozen in the manner so as to preserve its viability. The frozen probiotic culture is added to a food container with the food product to be processed during HPP. Without being bound by a particular theory, the inventors believe that the frozen state confers deformational resistance upon microorganisms of the probiotic culture and allows the probiotic culture to withstand HPP without a substantial loss in viability and to remain substantially intact during HPP. The frozen probiotic culture can withstand the high pressure despite, in some embodiments, being in a partial contact with some moisture of the food product. For the purposes of the instant invention, "being in a partial contact" means that the outer surface of the ice block can be in contact with the food product and even melt, as long as the inner portions of the ice block remain intact.

In some embodiments, the frozen probiotic culture is in a form of ice block which remains substantially intact (i.e., does not melt) during HPP. In one embodiment, the frozen probiotic culture is used in applications in which HPP is performed for a relatively short duration of time, for example, less than about 5 minutes. In another embodiment, HPP is conducted at a reduced temperature such as, for example, a temperature between about 1° C. and about 4° C.

In some embodiments, the frozen probiotic culture is additionally protected from exposure to moisture during HPP by a protective layer. The protective layer can be formed from a suitable material, or a combination of materials, having low permeability to moisture and/or low solubility in water, such that the protective layer provides a barrier to moisture contained in the food product. In some embodiments, the protective layer can be an additional ice layer that allows delaying the exposure of the frozen probiotic to the environment within the food product container and thus allows the ice probiotic culture to remain frozen during HPP.

In some embodiments, the additional substance is mixed with or dissolved in a gaseous liquid resistant to HPP such as, for example, a seltzer, a carbonated beverage, or sparkling wine. In other embodiments, the additional substance forms a porous material resistant to HPP. The additional substance is then added to the container with a food product in such a way as to maintain the additional substance in the form resistant to HPP during HPP. The probiotic frozen culture can be prepared for example in a form of ice block such that it remains substantially intact (i.e., does not melt) during HPP.

In embodiments in which the additional substance is disposed within an enclosure that is, in turn, disposed within a food packaging container, the additional substance (e.g., live-bacteria and/or yeasts probiotics, their metabolites, enzymes, nutraceuticals, prebiotics, etc.) may be sealed within the enclosure disposed in the food container's cap. However, the additional substance can be disposed in other parts of the food packaging container.

In some embodiments, under the application of high pressure, the barrier (e.g., in the form of an enclosure with the additional substance in the dry form), at least partially breaks, opens or otherwise loses the integrity such that the additional substance is released and can be introduced into the food product. Depending on the food product, the additional substance can be mixed with, dissolved in, or otherwise intermingled with the food product. If the additional substance includes microorganisms, they become able to reproduce once rehydrated.

In this invention, the additional substance is separated from the food product during at least a portion of a time-period during which HPP is performed. In some embodiments, as discussed above, the additional substance remains substantially in the dry form throughout HPP. In this way, the additional substance, which would have otherwise lost its beneficial properties, can withstand the application of HPP. Moreover, the food product can undergo HPP in its final (consumer-ready) package, while the additional substance is positioned in the same package, such that the additional substance can be mixed with the food product upon completion of HPP (and, in some cases, during HPP). This may be performed without any further separate action (e.g., upon the action of the high pressure) or when a certain action is taken (e.g., another turn of the cap of the container is made).

The method in accordance with the present disclosure allows using any desired combination of microorganisms, enzymes, nutraceuticals, and other substances, regardless of the substances' levels of sensitivity to high pressure. In this way, the described method does not limit a choice of probiotics (bacteria and/or yeasts) and other high-pressure-sensitive substances to be added to a food product. The described method can be used with mixtures of high-pressure-sensitive substances that would otherwise not be included together in the same food product due to their incompatibility with or different sensitivities to HPP.

FIGS. 1A and 1B illustrate an example of a system in which some embodiments of the instant invention can be implemented. As shown in FIG. 1A, the system includes a hermetically sealed enclosure 100 with at least one additional substance 102, which can be any one or more of probiotics (e.g., individual species or a mixture of bacteria and/or yeast(s) and/or their metabolites), enzymes, prebiotics, and other substances). The substance can be a biologically active substance, a drug, or any other substance which can be high-pressure-sensitive. For example, the hermetically sealed enclosure may include dry probiotic cultures.

The sealed enclosure 100 with the additional substance is disposed within a cap or cover 104 for a food product container 106. The food product container 106 can be any container suitable for HPP processing and configured for storing in its interior or cavity a food product 108, for example, a liquid food product such as, e.g., juice, milk, mineral water, drinking yogurt, probiotic beverage, or any other solid or semi-solid food product containing some moisture (e.g., yogurt, sauce, meat, etc.). The enclosure 100 with the additional substance 102 can be coupled to the cover 104 of the food product container 106 in various ways. For example, in the illustrated example, the enclosure 100 is disposed within the cover 104 using an enforcement ring element 110 positioned within the cover such that it holds the enclosure 100 within the cover 104. It should be appreciated that the ring element 110 is shown schematically by way of example only, as any suitable holding element or a combination of elements can be formed to attach the enclosure 100 within the cover 104. The holding element can be a separate element or it can be integrally and/or monolithically formed with the cover 104. During preparation of the food product, the enclosure 100 with the additional substance 102 sealed therein can be placed within the cover 104 so as to be held by the holding element.

In some embodiments, when high pressure is applied during the food product treatment, the hermetical seal of the enclosure 100 can be broken under the high pressure, such that the additional substance 102 is released from the enclosure 100 into the food product container 106 as shown schematically in FIG. 1B. In other embodiments described in more detail below, the enclosure 100 includes a flap, a valve, or another feature(s), which remains closed when high pressure is applied during HPP and opens when HPP is completed releasing the additional substance 102 into the food product container 106.

To the extent the additional substance 102 is not encapsulated or otherwise protected against HPP (for example, by compression into blocks, by freezing into ice blocks, or by mixing with a carbonated liquid), the material of the enclosure is such that it breaks only after HPP is completed. Similarly, the material and/or structure of the flap can be selected to ensure that the flap opens only after the HPP is completed. But, if the additional substance 102 is encapsulated in a protective coating or otherwise surrounded by a material capable of protecting the additional substance against moisture and/or effects of HPP, the enclosure 100 breaks (or the flap opens) during or after HPP. After the enclosure breaks or opens, the additional substance can be dissolved, dispersed, dissipated, or otherwise mixed with the food product 108 immediately (if it doesn't have a protective coating) or upon disintegration of the protective coating. The additional substance 102 thus remains dry and HPP-resistant during HPP and becomes rehydrated after the completion of HPP. In this way, in its consumer-ready form, the food container contains the pasteurized product with the additional substance 102 that has its beneficial biological activity and other properties preserved.

During or after HPP, the enclosure 100 can be broken by changing its configuration and/or integrity of its seal in various ways, to thereby release the additional substance 102 retained therein. For example, a portion of enclosure 100 can break, the entire enclosure 100 can break, and/or the enclosure 100 can change its configuration in a variety of ways. The enclosure 100 can be made such that it is designed to break under high pressure in a certain manner. It can be designed to break under a certain pressure and/or at a certain time point during the HPP. For example, in some embodiments, the enclosure 100 can be configured to break within 5, 3, 4, 2 minutes, 1 minute, or less than 1 minute prior to completion of the HPP. In some embodiments, the enclosure 100 can be configured to break within 1 minute, 50 seconds, 40 seconds, 30 seconds, 20 seconds, 15 seconds, 10 seconds, 5 seconds, 4 seconds, 3 seconds, 2 seconds, or 1 second prior to the completion of HPP. In some embodiments, the enclosure 100 can be selected that is configured to break after (e.g., substantially immediately after) the completion of the HPP. For example, in some embodiments, the enclosure 100 can be configured to break within 5, 3, 4, 2 minutes, 1 minute, 30 seconds, 20 seconds, 15 seconds, 10 seconds, 5 seconds, or less than 5 seconds after the completion of the HPP.

In the example shown in FIGS. 1A and 1B, the enclosure 100 can be made such that it has a top side 103 and a bottom side 105, with the bottom side 105 being closer to the bottom of the food product container 106. The top side 103 can be in the form of a cover applied over the body of the enclosure 100 after the additional substance has been placed into the enclosure body. The bottom side 105 of the enclosure 100 (e.g., at least a portion of the body of the enclosure 100) can be made such that the integrity of the bottom side is broken at least in part under the action of the high pressure, which leads to the release of the additional substance 102 from the enclosure 100. For example, in one embodiment, the bottom side 105 can have an area of the least resistance that is configured to break under high pressure. In another embodiment, the bottom side 105 can have a flap (integrated with the bottom side 105 or attached thereto) that is configured to open under high pressure during HPP. In yet another embodiment, the bottom side 105 can have a flap (integrated with the bottom side 105 or attached thereto) that is configured to open after HPP is completed and high pressure is released.

FIG. 2 illustrates another example of a system in which some embodiments can be implemented. As shown in FIG. 2, the system includes an enclosure 200 having top and bottom sides 203, 205, with the additional substance 202 (e.g., probiotic cultures (bacteria and/or yeasts), enzymes, etc.), installed inside a cap or cover 204 of a food packaging container 206. The food packaging container 206 includes a food product 208, as schematically shown in FIG. 2. In this example, the additional substance 202 is in the form of probiotic capsules. In other embodiments of the present invention, the additional substance 202 is any other type of the additional substance(s) in accordance with the present disclosure, and it can be included in any types of capsules, tablets, pills, etc. In some embodiments, the additional substance may be disposed within the enclosure 200 in a non-encapsulated form.

Further, it should be appreciated that although the cover 204 is shown in FIG. 2 to have an inner diameter greater than an outer diameter of a top portion 207 of the food packaging container 206. the cover 204 and other parts of the food product container can be of any suitable shape, size, configuration, and proportions. For example, a food packaging container can have a cap that occupies only a portion of the top or side portion of the container. The cover 204 can be affixed to the container 206 to seal it in various ways. Also, the food product container can be configured such that it does not have a separate cover, e.g., such that it can be sealed along one or more of its sides, etc.

In the example of FIG. 2, the enclosure 200 includes a body 212 and a cover 214 configured to be attached to the body 212. After the additional substance 202 (e.g., in the form of capsules, caplets, powder, etc.) is placed within the body 212 of the enclosure 200, the body 212 is sealed using the cover 214. Prior to or after the additional substance 202 is placed into an interior 201 of the enclosure 200, the enclosure 200 is affixed within the food packaging container 206 using a holding element 210, such as, e.g., a ring or any other holding element. The holding element can be a separate element coupled to the cover of the food product container or it can be an element that is integrally and/or monolithically formed with the cover or another portion of the food product container. In the example illustrated in FIG. 2, at least a portion of the bottom 205 of the body 212 of the enclosure 200, facing the interior of the food packaging container 206, is configured to break under high pressure thereby causing the encapsulated additional substance 202 to be released into the interior of the food packaging container 206. Once released, the encapsulated additional substance 202 is mixed with the food product while the dry additional substance remains protected from the moisture in the food product during HPP by the capsule's shell. After the HPP, the capsule's shell disintegrates and releases the dry additional substance into the food product 208 whereby the additional substance 202 is rehydrated.

Figure 3:
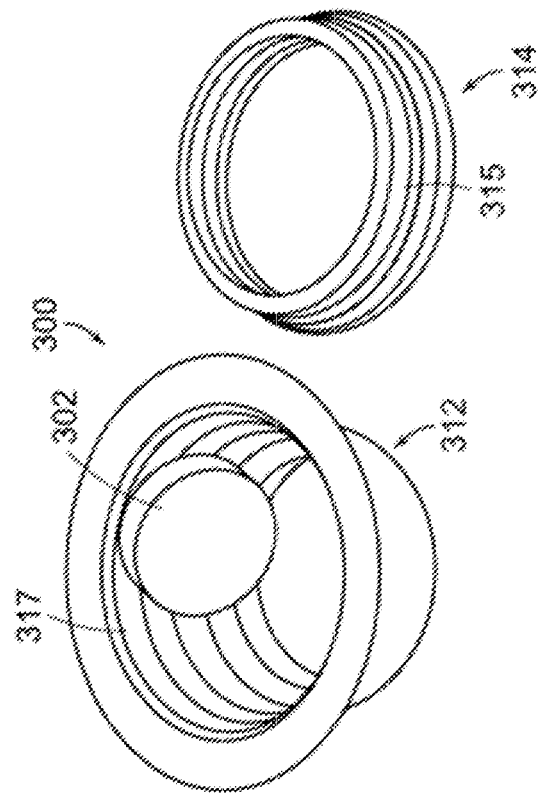
FIG. 3 is a perspective view of an example of a probiotic and an enclosure configured to releasably hold the probiotic, in accordance with some embodiments.

FIG. 3 illustrates another embodiment, in which an enclosure 300 is configured to releasably retain therein a biologically active substance in accordance with some embodiments. The enclosure 300 can serve as a barrier preventing mixing of the additional substance with the food product during HPP. In this example, the enclosure 300 comprises a body 312 and a cover 314 configured to be affixed to the body 312. The body 312 is shaped as a cap, and the cover 314 has a thread 315 on the outer surface thereof. The body 312 can also have a thread 317 on an inner surface of at least a top portion thereof, wherein the thread 317 is complementary to the thread 315 formed on the cover 314 and is configured to engage with the thread 315. It should be appreciated that the specific design of the enclosure 300 is shown in FIG. 3 by way of example only, as the enclosure can have various other configurations, and it can be sealable in various other ways.

As shown in FIG. 3, the biologically active substance 302, shown by way of example as a tablet, can be positioned within the body 312. The cover 314 can then be attached to the body 312 thereby sealing the biologically active substance 302 within the enclosure 300. At least a portion of the enclosure 300 can be configured to break under the action of the high pressure. For example, a portion 318 of a bottom of the enclosure 300 can be configured as breakable under high pressure. The enclosure 300 can be configured such that at least a portion of the bottom 318 breaks under the application of high pressure after a certain amount of time of exposure to the high pressure.

Figure 4:
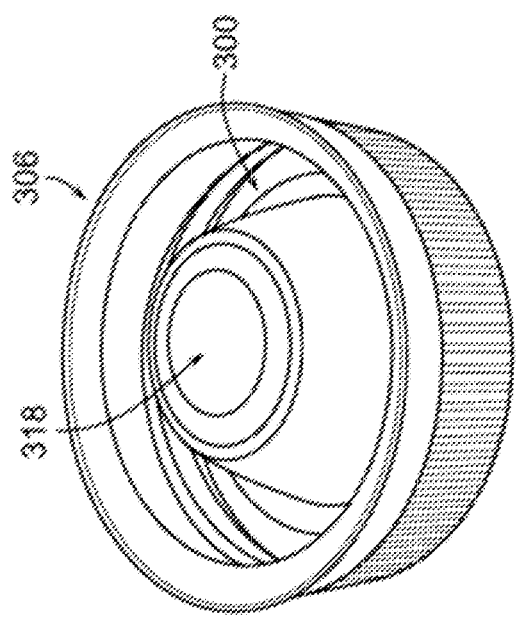
FIG. 4 is a perspective, bottom view of an example of a portion (cover) of a food packaging container having the enclosure with the probiotic of FIG. 3 coupled thereto, in accordance with some embodiments.

The enclosure 300 having the biologically active substance 302 sealed therein can be coupled to a food packaging container. Thus, FIG. 4 illustrates an example of a cap 306 of a food packaging container (not shown) that has the enclosure 300 coupled thereto. The enclosure 300 is coupled to an inner surface of the cap 306 that would face the interior of the food packaging container (not shown). This can be done using a suitable holding element, such that the cover 314 of the enclosure 300 is adjacent to (or coupled to) the inner surface of the cap 306. As mentioned above, at least a portion of the bottom 318 of the enclosure 300 can be configured to break under the application of high pressure to thereby release the biologically active substance 302 retained within the enclosure 300. After the enclosure breaks, the biologically active substance 302 dissolves, disperses, dissipates, or otherwise mixes with the food product contained within the food packaging container either immediately (if it doesn't have a protective coating) or upon disintegration of the protective coating. As discussed in more detail above, in either case, the biologically active substance remains separated from the food product and substantially dry or dry during HPP and becomes fully rehydrated after the completion of HPP to thereby form the final food product In some embodiments, a cap assembly can be used that is configured to maintain a dry biologically active substance separated from a food product and in the dry form during HPP. After the HPP, the biologically active substance can be brought in contact with the food product disposed within a food packaging container.

FIGS. 5A-5C show an embodiment of a food packaging assembly 500 comprising a body 502 and a cap assembly 504. The food packaging assembly 500, which can be a final packaging container that is being sold to a customer, allows preservation of a dry biologically active substance disposed within the assembly 500 in a dry form during HPP. The biologically active substance can be brought in contact with the food product after completion of the HPP.

The body 502 is shown by way of example in FIG. 5C in the form of a bottle (e.g., a plastic bottle). It should be appreciated that the food packaging assembly can have any other form and shape, including a pouch, bag, tub, jar, or any other container.

In some embodiments, the cap assembly 504 comprises a cap 505 (e.g., a cap configured to be removably coupled to the body 502) and a capsule assembly 506. A dry probiotic substance, e.g., a probiotic culture in the form of a pill or tablet 501 (e.g., a lyophilized probiotic culture, which can be compressed) can be placed within the capsule assembly 506 that is configured to self-open. It should be appreciated that the probiotic culture 501 is described in this example as being in the dry form; however, it can alternatively or additionally be in one or more of frozen, compressed, compacted, porous, carbonated solution, carbonated suspension form, or any other HPP-resistant forms. Regardless of its form, the probiotic substance forming the tablet 501 is separated from the food product by a barrier at least during a portion of HPP. In one embodiment described below, the probiotic substance 501 is separated from the food product by a barrier and remains dry until HPP is completed.

The capsule assembly 506 comprises a capsule body 508 and a valve 510 attached to the capsule body 508 via an attachment member 509. In some embodiments, the valve 510 and the attachment member 509 can be integrally and/or monolithically formed with the capsule body 508. In some embodiments, the valve 510, the attachment member 509, and the capsule body 508 can be separate components coupled together in a suitable manner. As shown in FIG. 5B, the capsule body 508 includes an inner ring 512 having a cavity 514 configured to receive therein the tablet 501. As also shown in FIG. 5B, the capsule body 508 includes a ring gap 516 formed between the outer wall of the inner ring 512 and an inner wall of the capsule body 508. The ring gap 516 is configured to receive therein a seal ring 518, such that the ring gap 516 is formed to fittingly receive therein the seal ring 518 that, in turn, has the shape and size that allows it to be sealably placed into the ring gap 516 around the inner ring 512. The ring gap 516 has a bottom (inner) surface and the seal ring 518 is inserted into the ring gap 516 such that there is a distance between the bottom surface of the ring gap 516 and the seal ring 518. It should be appreciated that the seal ring 518 is shown as a circular member by way of example only, as the seal ring (and the ring gap) may have other shapes.

In use, as shown in FIG. 5A, the tablet 501 is placed into the cavity 514 of the inner ring 512, after which the seal ring 518 is fitted into the ring gap 516 thereby forming an air gap between the bottom surface of the ring gap 516 and the seal ring 518. The valve 510 is then closed as shown in FIG. 5B, such that the attachment member 509 is positioned over the seal ring 518. In this way, the seal ring 518 ensures that the inner ring 512 is sealed and helps maintaining the valve 510 in the closed configuration.

After the capsule assembly 506 is assembled as shown in FIG. 5B, the capsule assembly 506 is inserted into an inner cavity 520 of the cap 505. As shown in FIGS. 5A-5C, the inner cavity 520 is formed on the bottom surface of the cap 505, by an inner surface 522 of the cap 505. Once the capsule assembly 506, with the tablet 501 sealed therein, is placed into the cap 505, the cap assembly 504 can be used to seal the body 502 that includes a food product. Thus, after the food product is disposed within the body 502, the cap assembly 504 is coupled to the body 502 to thereby seal the product.

The food packaging assembly 500 is then subjected to HPP. During HPP, under the high pressure, the seal ring 518 is moved deeper into the ring gap 516 thereby compressing the air gap between the bottom surface of the ring gap 516 and the seal ring 518. As a result, the contact between the valve 510 and the seal ring 518 is weakened. At the same time, under the action of high pressure, the valve 510 abuts the walls of the capsule assembly 506 thereby maintaining the hermetic sealing of the tablet 501, which is thereby kept in the dry form.

Once the HPP is completed and the pressure surrounding the food packaging assembly 500 decreases, the seal ring 518 remains in its deeper position adopted during the HPP allowing the valve 510 to open thereby releasing the tablet 501 into the body 502 of the food packaging assembly 500. In this way, the tablet 501 comes in contact with the treated food product inside the body 502. The probiotic culture thus mixes with or otherwise contacts the food product, and the food product thus becomes enriched with the probiotic culture.

In some embodiments, after HPP, the food packaging container is exposed to an elevated temperature for a certain time period—e.g., from about 3 hours to about 24 hours. In some embodiments, a consumer may incubate the food packaging for a certain time period. The elevated temperature can be greater than a temperature at which the food packaging container with the food product is stored prior to being sold to a consumer.

It should be appreciated that the systems of FIGS. 1A, 1B, 3, 4, and 5A-5C are shown by way of example only, as any suitable system can be used in which the probiotic (bacteria and/or yeasts) or another biologically active high-pressure-sensitive substance or mixture of substances are disposed within the food container in a HPP-resistant form (e.g., dry form) during the time the food container undergoes HPP. The probiotic (bacteria and/or yeasts) or another additional substance can be separated from the rest of the interior of the food product container in various ways. For example, a suitable membrane can be used to maintain the separation between the additional substance in the HPP-resistant form and the rest of the interior of the food product container. Further, although the probiotic (bacteria and/or yeasts) or another substance in a dry encapsulated, compressed or powdered form is shown to be releasably included in an enclosure coupled to the cover of the food package, the enclosure with the high-pressure-sensitive substance can be included in other portion(s) of the food package. The food package can be any package suitable for food storage and suitable for treatment by HPP.

Furthermore, in some embodiments, an enclosure with the biologically active substance, disposed within the food product package that undergoes HPP, can be made such that it does not break until a consumer performs a certain action. For example, a consumer will need to open the food product package, pull a tab, twist the cover or perform another action to cause the enclosure to release the biologically active substance into the inside of the food product package.

In some embodiments described herein, prior to the beginning of HPP, at least one biologically active substance (which can be encapsulated and/or positioned in a separate enclosure) can be included in the food packaging container that also includes a food product. In some embodiments, however, at least one encapsulated (or otherwise protected) dry biologically active substance can be added to a food product during HPP. This can be achieved using a suitable food packaging container which can include components, and/or can be associated with components, that allow introducing the encapsulated dry biologically active substance into the packaging container in which the food product is undergoing HPP. The components can be, for example, a self-sealing port, valve, or any other delivery component that allows introducing the encapsulated dry substance into the interior of the packaging container during HPP, without interrupting the course of HPP and without contaminating contents of the packaging container. In this embodiment, the capsule shell (or another protective layer that protects the high-pressure-sensitive substance during HPP) disintegrates and releases the biologically active substance into the food product sometime after HPP whereby a final consumer food product (i.e., a food product to be sold to consumers) is formed.

The probiotic (bacteria and/or yeasts) or another high-pressure-sensitive substance can be prepared in a dry form in any suitable manner, as the described techniques are not limited in this respect. For example, the substance can be lyophilized (e.g., freeze-dried). Other types of drying process include air-drying, spray-drying, and/or any other types of drying processes.

In some embodiments, the high pressure for HPP treatment is selected such that it causes deactivation or elimination of at least one pathogenic microorganism. In this way, the food product is preserved, pasteurized or sterilized within the container. The container can be a final packaging container in the consumer-ready form.

In some embodiments, the high hydrostatic pressure applied during HPP is between about 100 MPa and about 1000 MPa, between about 300 MPa and about 900 MPa, between about 300 MPa and about 800 MPa, between about 300 MPa and about 700 MP, between about 300 MPa and about 600 MPa, between about 300 MPa and about 500 MPa, between about 300 MPa and about 400 MPa, between about 400 MPa and about 650 MPa, between about 500 MPa and about 650 MPa, or above 600 MPa.

In some embodiments, the high pressure is in a range from about 100 MPa to about 1000 MPa, preferably from about 300 MPa to about 650 MPa, and more preferably from about 500 MPa to about 650 MPa.

In some embodiments, the high hydrostatic pressure is at least about 400 MPa, at least about 450 MPa, at least about 500 MPa, at least about 600 MPa, at least about 650 MPa, or at least about 700 MPa, at least about 750 MPa, or at least about 800 MPa. In some embodiments, the high hydrostatic pressure is about 400 MPa, about 450 MPa, about 500 MPa, about 600 MPa, about 650 MPa, about 700 MPa, about 750 MPa, or about 800 MPa.

In some embodiments, the high pressure is between about 400 MPa and about 650 MPa (and preferably between about 500 MPa and about 650 MPa), which may be sufficient to achieve proper sterilization and/or pasteurization of a food product. The values of the high pressure and a time at the high pressure can be selected based on properties of a food product to be treated, a purpose of the treatment, desired properties of the food product after the treatment, intended storage conditions of the food product, desired shelf life of the product, and other factors. As discussed above, the choice of the probiotic culture (bacteria and/or yeasts) and/or other high-pressure-sensitive biologically active substance (and a combination of any of biologically active substances) is not affected by the required high pressure and the length of HPP, since the methods disclosed herein protect the biologically active substances from effects of HPP. Accordingly, even at relatively high pressure values, such as, about 600 MPa or greater than 600 MPa, the high-pressure-sensitive substances can preserve their original beneficial biological properties.

During HPP, the high pressure can be applied for a duration of time of between about 1 minute and about 15 minutes, more preferably between about 3 minutes and about 10 minutes, and more preferably between about 3 minutes and about 5 minutes.

In some embodiments, the high pressure can be applied for a duration of time of between about 1 minute and about 20 minutes, between about 1 minute and about 15 minutes, between about 3 minutes and about 15 minutes, between about 5 minutes and about 15 minutes, between about 10 minutes and about 15 minutes, between about 3 minutes and about 10 minutes, or between about 3 minutes and about 5 minutes.

The duration of time of HPP can be selected based on a food product and its characteristics, a desired shelf-life for the food product, and other factors. As discussed above, the choice of the probiotic culture (bacteria and/or yeasts) and/or other biologically active substance (and a combination of any of biologically active substances) is not affected by the required duration of HPP, since the methods disclosed herein protect the biologically active substances from effects of HPP.

In some embodiments, the high pressure can be applied for a duration of time of between about 3 minutes and about 5 minutes. Furthermore, the described techniques allow applying the high pressure for a required duration of time, including an extended duration of time (e.g., at least 10 minutes, at least 11 minutes, at least 12 minutes, at least 13 minutes, at least 14 minutes, or at least 15 minutes) while maintaining biological activity of the added biologically active substance.

In some embodiments, a method of preparation of a food product is provided that includes placing at least one additional substance capable of conferring a health benefit to a subject in the vicinity of the food product that is disposed within an interior of a container, wherein the additional substance is in a dry form and is separated from the food product by a barrier. The method further includes applying high pressure to the container including the food product as discussed above. The barrier is configured to at least partially break at such a time that ensures that the additional substance remains dry during HPP. For example, the encapsulated dry additional substance can be released into and mixed with food product during HPP because the dry additional substance remains protected from the moisture in the food product during HPP by the encapsulation. After the HPP, the capsule's shell disintegrates and releases the dry additional substance into the food product thereby forming a final consumer food product (i.e., a food product to be sold to consumers). On the other hand, the dry additional substance in a loose powder form can be released into the interior of the container and contact the food product only after HPP is completed to avoid exposure to the moisture in the food product during HPP. Accordingly, this method provides for preparation of a pasteurized product with an active additional substance capable of conferring the health benefit to the subject.

In some embodiments, the additional substance comprises at least one living species of bacteria and/or yeast. In some embodiments, the at least one living species comprises one or more of *Lactobacillus* spp., *Bifidobacterium* spp., and *Saccharomyces* spp. Non-limiting examples of *Lactobacillus* species include *L. acidophilus, L. bulgaricus, L. paracasei, L. casei, L. lactis, L. fermentum, L. rhamnosus, L. johnsonii, L. plantarum, L. reuteri, L. salivarius, L. brevis, L. helveticus, L. grasseri*, and combinations thereof. Non-limiting examples of *Bifidobacterium* species include *B. bifidum, B. infantis, B. breve, B. longum, B. lactis*, or any combinations thereof.

In some embodiments, the at least one living species comprises one or more of *Streptococcus thermophilus, Lactobacillus bulgaricus, L. acidophilus, L. lactis, L. casei, L. paracasei, L. brevis, L. plantarum, L. rhamnosus, L. fermentum, L. salivarius, L. caucasicus, L. helveticus, L. reuteri, L. johnsonii, L. grasseri, Bifidobacterium bifidum, B. infantis, B. longum, B. thermophilum, Saccharomyces bou-

*lardii, Bacillus subtilis, B. lichenformis, Enterococcus faecium, Propionibacterium jensenii*, or any combinations thereof.

In some embodiments, the probiotic or prebiotic includes yeast which can comprise any one or more of *Saccharomyces* spp., *Hansenula* spp., *Kluyveromyces* spp. *Schizzosaccharomyces* spp. *Zygosaccharoinyces* spp., *Pichia* spp., *Monascus* spp., *Geotrichum* spp. and *Yarrowia* spp. Other suitable probiotics and prebiotics are disclosed for example in Spiller (2008) Aliment Pharmacol Ther. 28(4):385-96, the content of which is hereby incorporated by reference in its entirety.

In some embodiments the additional substance can be a "nutraceutical," which is a food substance or part of a food that provide medical or health benefits, including the prevention, treatment, or cure of a disorder or disease. Non-limiting examples of nutraceuticals include green tea (*Camellia sinensis*) in any suitable form (e.g., whole leaf, powder, chopped leaf, etc.), turmeric rhizome (*Curcuma longa*), amaranth (e.g., any suitable *Amaranthus* spp.), chia (*Salvia hispanica*), and any other active ingredients. Nutraceuticals can be natural and/or synthetic compounds.

The barrier can have various suitable configurations. For example, the barrier can be configured to at least partially break during the application of the high pressure to thereby release the additional substance into the interior of the container. The barrier can be configured to at least partially break within a certain time period prior to completion of the application of the high pressure, wherein the time period comprises about 5 minutes, about 3 minutes, about 2 minutes, about 1 minute, about 30 seconds, about 20 seconds, about 10 seconds, about 5 seconds, about 4 seconds, about 3 seconds, about 2 seconds, about 1 second, or less than about 1 second prior to the completion of the application of the high pressure.

In some embodiments, the barrier is configured to at least partially break after the application of the high pressure to thereby release the additional substance into the interior of the container. The barrier can be configured to at least partially break within a certain time period after completion of the application of the high pressure, wherein the time period comprises about 5 minutes, about 3 minutes, about 2 minutes, about 1 minute, about 30 seconds, about 20 seconds, about 10 seconds, about 5 seconds, about 4 seconds, about 3 seconds, about 2 seconds, about 1 second, or less than about 1 second after the completion of the application of the high pressure.

The additional substance in the dry form can comprise a powder, granules, tablet, pill, or pressed powder. Any other form can be used, including any combination of the above. In some cases, the dry form (e.g., the pressed powder, tablet, or pill) can be capable of preserving the dry form during the application of the high pressure. The barrier can comprise encapsulation, and the encapsulation can be a capsule, microcapsule, or caplet capable of preserving the dry form included therein during the application of the high pressure. Any other encapsulating element can be used, including any combination of the above. In some embodiments, the additional substance (in the form of, e.g., a powder, granules, tablet, pill, pressed powder, etc.) can be coated with one or more protective moisture-barrier layers.

In some embodiments, the additional substance is placed within the container including the food product. In some embodiments, the additional substance is placed within a cap of the container.

In some embodiments, the barrier comprises an enclosure having the additional substance releasably encapsulated therein. Additionally or alternatively, the barrier can be or can include a membrane, a coating releasably encapsulating the additional substance, or any other feature. Regardless of its specific configuration and other properties, the barrier can be a moisture barrier. In some embodiments, the additional substance in the dry form can be additionally encapsulated (using, e.g., a moisture-barrier capsule) and it can be included in an enclosure (serving as the barrier) in the encapsulated form.

The methods of the present invention allow maintaining the capability of the additional substance to confer the health benefit to the subject after HPP treatment. When the additional substance contains a probiotic, the methods of the present invention allow to maintain at least 90%, at least 80%, at least 70%, at least 60%, or at least 50% of the original (i.e., pre-HPP) viability and/or biological activity of the probiotic after HPP. The viability and/or activity of a probiotic can be measured, for example, in colony-forming units. A person of skill in the art would recognize that other known methods exist for assessing a viability of a probiotic. Accordingly, in some embodiments, the food products with probiotic processed by HPP in accordance with the methods of the present invention contain probiotic characterized by the number of colony-forming units that are at least 99%, at least 98%, at least 97%, at least 96%, at least 95%, at least 94%, at least 93%, at least 92%, at least 91%, at least 90%, at least 80%, at least 70%, at least 60%, or at least 50% of the original (i.e., pre-HPP treatment) number of colony-forming units.

In some embodiments, a method of preparation of a food product is provided that can include placing at least one additional substance having biological activity in a packaging container including a food product, wherein the substance is in a dry form and is separated from the food product by a barrier. The method can further include applying a high pressure processing (HPP) to the packaging container to thereby perform preservation, pasteurization, and/or sterilization of the food product included therein, while maintaining the biological activity of the additional substance, wherein the barrier is configured to change its configuration to thereby release the substance into the packaging container such that the additional substance is brought in contact with the food product.

In some embodiments, a food packaging container being suitable for application of HPP thereto is provided. The food packaging container can include a first enclosed area of the packaging container having a food product disposed therein, and a second enclosed area of the packaging container having an interior separated from the first enclosed area by a barrier, wherein the interior releasably includes at least one substance having biological activity in a dry form. The food packaging container can also optionally include at least one feature in a first configuration that is configured to change from the first configuration to a second configuration to thereby cause the substance be released from the interior of the second enclosed area into the first enclosed area.

In some embodiments, the second enclosed area can be disposed within the first enclosed area. In some implementations, the first enclosed area comprises a body and a cap or cover, and the second enclosed area is disposed within the cover. The second enclosed area can be coupled to, integrally and/or monolithically formed with, or be otherwise disposed within or in association with the cover or another portion of the first enclosed area.

In some embodiments, the second enclosed area includes a sealed enclosure and the feature having the changeable configuration is at least a portion of the sealed enclosure. For example, as discussed above, the feature can be at least a portion (e.g., a bottom) of an enclosure or container releasably holding the dry biologically active substance. In some implementations, the feature can be a flap, a tab (e.g., a pull tab), a button, a string, or any other feature that can change its configuration automatically (e.g., under the high pressure applied during HPP) to thereby cause the dry biologically active substance release from the substance's enclosure.

In some embodiments, the feature can be configured to be manipulated manually, which can be done, e.g., by a consumer. In such embodiments, the biologically active substance is not mixed with the food product in a packaging container until the feature is activated to cause the dry biologically active substance be released from the substance's enclosure.

The food packaging container, which can be configured to releasably include the additional substance in a dry form, can be formed from any material that has properties suitable for HPP. The properties can include flexibility, being water impermeable and food-safe, having sufficient mechanical strength, and other desirable properties. Non-limiting examples of materials include various plastics, e.g., polyethylene (PE), polypropylene (PP), low-density polyethylene (LDPE), ethylene-vinyl alcohol (EVOH), EVOH/EVOH blend, polyethylene terephthalate (PET), metallized polyester (PETmet), polypropylene SiOx recovered (PP-SiOx), LDPE/EVOH/LDPE, PE/EVOH/PE, PETmet/LDPE, PET/LDPE PPSiOX, or any other material or a combination of materials suitable for storing food and suitable for HPP. In some cases, the plastics(s) can be in the form of a film.

Any container suitable for preservation, HPP treatment and consumption of the food product can be used. For example, the packaging container can be bottle, a pouch, a bag, flask, pack, jar, tray, etc.

The enclosure incorporating the at least one additional substance in the dry form can also be made from any suitable materials, including any of the above materials. The enclosure can be designed and manufactured such that it is suitable for application of high pressure, while at least a portion of the enclosure can be made such that the portion is configured to break under the high pressure thereby releasing the content of the enclosure.

In some embodiments, a food product is provided that includes, in a sealed packaging container, at least one edible ingredient, and at least one additional substance having biological activity. The at least one edible ingredient is enclosed within the packaging container and undergoes HPP comprising application of high pressure to cause deactivation or elimination of at least one pathogenic microorganism in the edible ingredient. The at least one additional substance is also enclosed within the packaging container comprising one or more of a probiotic (bacteria and/or yeasts), prebiotic, enzyme, nutraceutical and microbial metabolites. The microbial metabolites may include a number of substances with beneficial health-promoting properties, including substances with anti-inflammatory and/or antibiotic activity. See Descamps et al., The path toward using microbial metabolites as therapies. EBioMedicine (2019); 44:747-754.

The at least one additional substance undergoes HPP in a dry form while disposed within the packaging container, and wherein the additional substance maintains its biological activity after HPP at a suitable level. In some embodiments, the suitable level of biological activity is the level of biological activity after HPP that is substantially the same as the level of biological activity prior to HPP. In other embodiments, the suitable level of biological activity after HPP is at least 90%, at least 80%, at least 70%, at least 60%, or at least 50% of the original (i.e., prior to HPP) viability and/or activity of the additional substance. The viability and/or activity can be measured, e.g., in colony-forming units. In some embodiments, wherein maintaining the capability of the additional substance to confer the health benefit to the subject comprises maintaining at least 99%, at least 98%, at least 97%, at least 96%, at least 95%, at least 94%, at least 93%, at least 92%, at least 91%, at least 90%, at least 80%, at least 70%, at least 60%, or at least 50% of the original (i.e., prior to HPP) number of colony-forming units of the additional substance after HPP. For the purposes of the instant disclosure, the biological activity both "after HPP" and "prior to HPP" is the biological activity of the additional substance after it is mixed with the edible ingredient and thereby rehydrated. The mixing and rehydration occurs after HPP to determine the biological activity "after HPP." The mixing and rehydration occurs without HPP (or prior to HPP) to determine the biological activity "prior to HPP."

The edible ingredient can be sterilized, and the additional substance can be then added thereto. The edible ingredient can be any food product (including beverage), food supplement or any other product that can be consumed by a human. Also, in some embodiments, the food product comprising the edible ingredient can be prepared for consumption by an animal (e.g., a dog, cat, etc.).

In some embodiments, the packaging container comprises a first portion containing the edible ingredient, a second portion having, prior to the HPP, an interior separated from the first portion by a barrier, wherein, prior to the HPP, the interior of the second portion releasably includes the additional substance in the dry form, and at least one feature in a first configuration that is configured to change from the first configuration to a second configuration to thereby cause the additional substance be released from the interior of the second portion into the first portion.

In some embodiments, the second portion is disposed within the first portion. The first portion may comprise a body and a cover, and the second portion can be disposed within the cover. In some implementations, the second portion is coupled to or integrally and/or monolithically formed with the cover. In some embodiments, the second portion comprises an enclosure and the at least one feature is at least a portion of the enclosure, wherein the enclosure is sealed prior to the HPP. In some embodiments, the at least a portion of the sealed enclosure is configured to change from the first configuration to the second configuration under the action of a high pressure during the HPP In some embodiments, the additional substance added to a food product can be a biologically active substance comprising microorganisms that, when, after inoculating the food product, incubated at a certain temperature, can convert the food product into a fermented food product. For example, milk can be converted into yogurt, kefir, cheese, or another fermented product, or fruit juice can be converted into a fermented juice. If desired, the fermented product may contain gas formed during fermentation. For example, the additional substance can be yeast and the edible ingredient (such as a fruit juice) may contain a predetermined amount of sugar to control the amount of gas produced during fermentation. Additionally or alternatively, the additional substance may include baking soda and/or other substances capable of generating carbon dioxide when combined with the food product. Accordingly, the methods of the instant invention allow production of pasteurized carbonated beverages (including fermented carbonated beverages) in the consumer-ready food packaging containers, including, without limitation, carbonated sodas, lemonades, juices, and wines. Conventional HPP methods do not allow production of such carbonated fermented beverages in consumer-ready food packaging containers that undergo HPP and then are sold to consumers. Instead, conventional methods utilize fermenters to produce fermented food products and then place the fermented products into consumer-ready packaging.

In some embodiments, HPP, inoculation of a food product with one or more biologically active substances, and fermentation of the inoculated food product can occur with a closed food packaging container, thereby producing a pasteurized fermented product In one embodiment, a first probiotic food product is obtained by applying HPP to the packaging container containing the food ingredient and the probiotic culture in a dry form. The probiotic culture comprises bacteria and/or yeast that are at least partially in a dormant state and are not reproducing. The food ingredient is a liquid food ingredient or a semi-solid food ingredient containing moisture. After HPP is completed, the probiotic culture is mixed with the food ingredient. Next, the first probiotic food product is exposed to an elevated incubation temperature for a predetermined period of time to thereby cause the first food product to become a fermented food product (also referred to as "a second food product"), wherein the exposure of the probiotic food product to the elevated temperature causes microorganisms in the probiotic culture to transition from the dormant state into a reproducing state. The elevated temperature can be greater than a temperature at which the packaging container with the food product and the probiotic culture is stored prior to being sold to a consumer.

The first food product can be or can include milk or a non-dairy product such as juice, and the second food product can be a yogurt, kefir, cheese, fermented juice, fermented tea or another fermented product. In some embodiments, the probiotic culture contains include *Lactobacillus* species and the second food product is a lacto-fermented food product, including without limitation a lacto-fermented juice, grain, herbal tea, lemonade, soda, kvass or dairy product.

In some embodiments, the elevated temperature can be between about 38° C. and about 46° C., between about 37° C. and about 44° C., or between about 38° C. or about 42° C. It should be appreciated, however, that any suitable incubating temperature can be used. The packaging container can be exposed to the elevated temperature for a suitable time-period. For example, in some embodiments, the time-period can be between about 3 hours and about 24 hours, or between about 5 hours and about 12 hours.

Those skilled in the art would appreciate that the incubation time in accordance with the present disclosure can be between about 5 hours and about 10 hours, between about 5 hours and about 9 hours, between about 5 hours and about 8 hours, between about 5 hours and about 7 hours, between about 5 hours and about 6 hours. In some embodiments, the duration of incubation time ranges between about 3 hours and about 6 hours or between about 3 hours and about 5 hours. In some embodiments, the incubation time ranges between about 10 hours and about 12 hours, etc. The incubation time can be selected based on the particular types of microorganisms (bacteria and/or yeasts) and/or the desired properties of the second food product (e.g., thickness, taste, texture). For example, for a denser yogurt and tart taste, longer incubation times could be used.

In some embodiments, the HPP allows preparing fermented foods, including without limitation lacto-fermented foods. Lacto-fermented foods prepared in accordance with the methods of the instant invention include without limitation lacto-fermented fruit and/or vegetable juices, grains, seeds, nuts, grasses, herbal teas, lemonades, sodas, and dairy products. In some embodiments, the fermented pasteurized foods are conveniently prepared in the final, consumer-ready packaging.

Conventional approaches for lacto-fermenting food products suffer from a number of disadvantages. For example, conventional approaches for lacto-fermenting freshly squeezed juices involve fermentation using epiphytic microflora naturally occurring on the surface of washed fruit and vegetables with an addition of at least one type of *Lactobacillus* (lactobacteria). But epiphytic microflora of washed fruit and vegetables typically includes predominantly yeasts, which, during fermentation, produce ethanol, carbon dioxide, and other by-products. Such by-products not only reduce organoleptic properties (taste and smell) of thereby fermented products, but also limit their use due to their ethanol content. Moreover, large amounts of gas produced during such fermentation make it impossible to use these conventional methods in a sealed final, consumer-ready, container. Because of these challenges, existing fermentation techniques utilize specialized fermenters that produce fermented food products (e.g., fermented juices), after which the fermented food products are placed into consumer-ready packaging. This process, however, is costly and is associated with a risk of recontamination of the fermented food products by pathogenic microorganisms. Also, epiphytic microflora of the raw products, besides yeasts, may include pathogenic microorganisms which may withstand the fermentation and thus remain in the final consumer product. To ensure safety of the fermented food product, it may be pasteurized. However, pasteurization kills lactobacteria, and the fermented food product thereby loses its biological (e.g., probiotic) activity and its health benefits. The methods and products of the present invention address these disadvantages.

The present application also provides kits for preparing packaged food products, which can be packaged in food products packages including at least one biologically active substance in accordance with the present disclosure. The kit is an assemblage of materials or components, including at least one of the inventive food packaging container equipped with an enclosure for releasably holding therein any one or more of biologically active substances (which can be high-pressure sensitive) as described herein. The kit can include one or more of any other components.

The kit can include a food product package and an enclosure for the biologically active substance(s), which can be a separate component or it can be coupled to the food product package. The exact nature of the components configured in the kit depends on its intended purpose. In one embodiment, the kit is configured for the purpose of preparing a food product using HPP. Optionally, the kit also contains other useful components, such as, e.g., applicators, measuring tools, or other useful paraphernalia as will be readily recognized by those of skill in the art. Instructions for use may be included in the kit.

As discussed above, the present disclosure can be applied to any type of substance that is desired to be protected against high pressure during HPP. Non-limiting examples of such substances include probiotics (bacteria and/or yeasts), enzymes, prebiotics, nutraceuticals, vegetable extracts, food ingredients, bioactive food ingredients, functional food ingredients, drugs, medicaments, and/or any combination thereof. The substances can be prepared to confer medical, health, and nutritional benefits to an organism of a subject.

The subject can be a human or another mammal. Thus, in some embodiments, the food product can be an animal food product.

Definitions

As used herein, "a," "an," or "the" can mean one or more than one.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the compositions and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of terms such as including, containing, or having, is used herein to describe and claim the invention, the present invention, or embodiments thereof, may alternatively be described using alternative terms such as "consisting of" or "consisting essentially of."

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

EXAMPLES

Example 1

The food product preparation method in accordance with embodiments of the present disclosure was performed for illustration purposes, using the equipment of True Fresh HPP (Buena Park, CA) under the high pressure of about 6000 bar (or about 600 MPa) that has been applied for about 15 minutes. The following bacterial and yeast species were included in the probiotic mixture: *Lactobacillus bulgaricus* LB1051 (KAZ International, Inc., Torrance, CA), *Streptococcus thermophilus* CNRZ1066 (VitaWay, LLC., Armenia), *Lactobacillus acidophilus* Er-2 strain 317/402 "NARINE" (VitaWay, LLC., Armenia), and *Saccharomyces boulardii* 1-3799 (NOW Foods, Bloomingdale, IL), which are known to have low resistance to application of high pressure. The test food product was cold-pressed juice packaged in 12 oz bottles manufactured by the U.S. Plastic Corp. The bottles with juice were divided into the following three groups:
  a. A control group having a certain amount of each of the probiotic cultures mixed with juice to obtain the probiotic-containing juice having about $10^7$ microorganisms in one milliliter (ml);
  b. A second group, in which the same amount of microorganisms as in Group I was added to the bottles with juice, about 6-7 hours before the high pressure processing; and
  c. A third group, in which the same amount of microorganisms as in Group I was incorporated, in a dry form, into vegetarian capsules which were placed into an enclosure. About 6-7 hours before the high pressure processing, the enclosure was coupled to a cover of each of the bottles with juice (the setup was generally similar to the systems of FIGS. 1A, 1B, and 2) thereby forming a barrier between the capsules with the probiotic mixture and the juice inside the bottles.

The bottles with juice were sealed, and the bottles of Groups II and III were simultaneously exposed to high hydrostatic pressure of about 6000 bar (600 MPa) for a time period of about 10 minutes. About 30 minutes after HPP was completed, all capsules in Group III disintegrated and their contents mixed with the juice. The number of live cultures was then determined in the samples of juice obtained from each of the bottles of Groups II and III. Results of the test are shown in Table 1.

TABLE 1

| | Number of live probiotic cultures, colony forming units (CFU)/ml | | |
|---|---|---|---|
| Probiotic culture | Group I (control) | Group II | Group III |
| *Lactobacillus bulgaricus* LB1051 | $1.4 \times 10^7$ | N.D. (not detected) | $1.2 \times 10^7$ |
| *Streptococcus termophilus* CNRZ1066 | $2.5 \times 10^7$ | $4.4 \times 10^4$ | $2.4 \times 10^7$ |
| *Lactobacillus acidophilus* Er317/402 | $6.3 \times 10^7$ | $9.6 \times 10^4$ | $5.9 \times 10^7$ |
| *Saccharomyces boulardii* 1-3799 | $5.9 \times 10^7$ | N.D. (not detected) | $6.1 \times 10^7$ |

The results summarized in Table 1 show that, when the live probiotic cultures were mixed with the food product prior to the HPP (Group II), the probiotic cultures were completely or at least partially eliminated from the processed food product (i.e., pasteurized juice after the HPP). In particular, *Lactobacillus bulgaricus* and *Saccharomyces boulardii* were completely destroyed (such that they are not detectable after the HPP), whereas the number of *Lactobacillus acidophilus* and *Streptococcus thermophilus* is reduced by three orders of magnitude.

On the other hand, the inventors unexpectedly discovered that, when the probiotic cultures remained in a dry form during the HPP process (Group III), the probiotic cultures remained live after the HPP. As shown in Table 1, the number of probiotic cultures in Group III after the HPP is about the same as in the control Group I, which did not undergo the HPP.

It should be appreciated that the experiments in this example were conducted for the purpose of illustrating the feasibility and efficiency of the methods in accordance with the present disclosure. The example generally shows that the methods in accordance with the present disclosure allow high pressure processing of food products and supplements containing high-pressure sensitive microorganisms, including yeast, which is known to be particularly sensitive to high pressure. While the feasibility experiment described above was conducted using juice, those skilled in the art would appreciate that the same methods can be used to protect high-pressure sensitive microorganisms and biologically active substances in any liquid food product or supplement (including, but not limited to, milk, juice, water, and soft drinks), semi-solid or other products containing some level of moisture (including, but not limited to, yogurt, cottage cheese, and apple sauce).

In addition, the exposure to the pressure of about 600 MPa for about 10 minutes, as used in this example, are parameters that are somewhat more stringent than parameters that may be used in food product and food supplement sterilization and/or pasteurization methods in accordance with some embodiments of the present disclosure. As discussed above, the exposure to high pressure can be between about 3 minutes to about 10 minutes, more preferably between about 3 minutes and about 5 minutes (other ranges can be used as well). The high pressure can range from about 400 to about 650 MPa, or form about 500 MPa to about 650 MPa (with various other ranges being possible). The more stringent parameters were used in the experiments described in this example to demonstrate that, even under such harsh conditions, the number of probiotic cultures remaining viable after HPP is about the same as in the control group (Group I), which did not undergo HPP. Those skilled in the art would appreciate that the methods described in this disclosure can be used to prepare a broad range of pasteurized food products and food supplements containing probiotics and biologically active substances because the instant methods allow selection of the pasteurization pressures and times appropriate for a particular food or supplement without a regard for the sensitivity of such probiotics and biologically active substances to high pressure.

Prophetic Example 2

A probiotic food product or a first food product (such as, for example, probiotic milk) can be prepared in accordance with embodiments of the present disclosure such that the probiotic food product contains a food ingredient (here, milk) and one or more of added probiotic microorganisms such as bacteria and/or yeasts (the added probiotic microorganisms are collectively referred to as a "probiotic culture" and milk mixed with the probiotic culture is referred to as "probiotic milk" in this example). The food ingredient (here milk) and the probiotic culture undergo HPP to obtain a pasteurized finished product. During HPP treatment, the probiotic culture remains in a dry form by being separated from the milk by a barrier. In this example, milk is whole cow's milk. Those skilled in the art would appreciate that the methods of the instant disclosure can be used with any type of milk or another liquid or semi-solid product containing moisture. Milk can be dairy or non-dairy. Examples of dairy milk would be known to those skilled in the art and include, for example, cow's, sheep's, goat's milk, and milk of other mammals. Milk may have any fat content (e.g., whole milk, skim milk, buttermilk). Examples of non-dairy milk or milk-like products would be known to those skilled in the art and include, for example, milk made from soy, almond, coconut, cashew, rice, hemp, sunflower, pumpkin, oats, and potato.

In this example, the probiotic culture contains yeast and yogurt-starting bacteria. But those skilled in the art would appreciate that, in accordance with instant invention, the probiotic culture can be any of a various types of probiotic cultures comprising bacteria and/or yeasts. The probiotic culture can be selected such that it is a yogurt-forming culture, kefir-forming culture, a cheese-forming culture, or another type of probiotic culture.

In this example, the probiotic culture is provided in a dry form and is activated when it is rehydrated with milk (forming a probiotic milk). The probiotic milk (the first food product) is incubated at a culturing temperature (i.e., temperature within a temperature range that allows the probiotic culture to procreate and proliferate) to form yogurt (the second food product). In this example, the culturing temperature is about 38° C. and the incubation time is about 5 hours. As discussed above, those skilled in the art would appreciate that the culturing temperature in accordance with the instant disclosure can be between about 32° C. and about 46° C. In some embodiments, the temperature is between about 37° C. and about 44° C., or between about 38° C. and about 42° C. The temperature can be selected based on types of microorganisms (bacteria and/or yeasts) included in the probiotic culture and/or the desired qualities of the second food product (e.g., thickness, taste, texture).

Those skilled in the art would appreciate that the incubation time in accordance with the instant disclosure can be between about 3 hours and about 24 hours. In some embodiments, the incubation time can range between about 5 hours and about 12 hours, between about 5 hours and about 10 hours, between about 5 hours and about 9 hours, between about 5 hours and about 8 hours, between about 5 hours and about 7 hours, between about 5 hours and about 6 hours. In some embodiments, the duration of time ranges between about 3 hours and about 6 hours or between about 3 hours and about 5 hours. In some embodiments, the incubation time ranges between about 10 hours and about 12 hours, etc. The incubation time can be selected based on the particular types of microorganisms (bacteria and/or yeasts) and/or the desired properties of the second food product (e.g., thickness, taste, texture). For example, for a denser yogurt and tart taste, longer incubation times could be used.

Those skilled in the art would appreciate that the probiotic culture can be selected such that its culturing temperature is higher than a temperature at which the first food product is transported and stored. In this way, prior to exposing the first food product with the probiotic culture to the culturing temperature, the probiotic culture, while alive, is at least partially in a dormant, non-reproducing state.

The fermented food product (also referred to as "the second food product") can be prepared by a consumer, after the consumer has purchased the first food product (i.e., probiotic food product). For example, when the probiotic culture is a yogurt-forming culture, a probiotic milk containing the culture can be maintained refrigerated until a consumer incubates the probiotic milk at the culturing temperature.

In some embodiments, the probiotic culture contained in a food container with (but separately from) the first food product can be mixed with milk during or after (e.g., immediately or shortly after) HPP. For example, a food product container including the milk and an encapsulated probiotic culture (separated from milk by a barrier) can be configured such that the barrier at least partially breaks under the action of high pressure during HPP, as described above (e.g., in connection with FIG. 1A, 1B, 2, 3, 4, or 5A-5C). In such embodiments, the consumer-ready first food product (here, probiotic milk) will have the probiotic culture mixed with the food product. As another variation, in some embodiments, a food product container including the food product can be configured such that a certain action is required to cause the probiotic culture be released from its enclosure within the food product container and mixed with the food product while preserving the integrity of the food product container and ensuring that no contaminants are introduced into the pasteurized or sterilized food product. For example, the food product container can have a tab, string, button, strip, or any other feature that is configured to be activated (e.g., pulled, pressed, pushed, removed, turned, etc.) to thereby cause the probiotic culture be released from its enclosure and mix with the food product. Regardless of the specific way in which the probiotic culture is brought into contact with the food product, the probiotic culture begins to rehydrate upon contact with the liquid food product or non-liquid food product that contains moisture. The probiotic culture remains substantially in the dry form during the entirety of the duration of application of high pressure during HPP.

In some embodiments, the food product container can include or can be associated with a feature that allows monitoring a temperature within the food product container and/or a temperature of an environment around the food product container. For example, the food product container can be placed in a water bath or in another warm environment, and a temperature of this environment can be monitored. The feature for measuring the temperature can be a thermometer or temperature indicator strip which can be fixedly coupled to the food packaging container. In some implementations, however, the feature for measuring the temperature can be a separate element which can be sold together with the food packaging container, e.g., as part of a kit.

Prophetic Example 3

A food product, such as a fruit or vegetable juice, is received by cold processing of fruit and/or vegetables, and is placed into a final, consumer-ready food packaging container. An example of the food packaging container is a bottle covered with a cap assembly, as shown in FIGS. 5A-5C. It should be appreciated, however, that the food packaging container can have any other configuration. The food packaging container includes at least one biologically active substance, such as, e.g., probiotic bacteria, and the biologically active substance is kept separate from the food product during HPP. For example, the biologically active substance can be releasably enclosed within the cap of the food packaging container. For example, a cap assembly shown in FIGS. 5A-5C and described above is used.

The sealed container, with the food product enclosed herein, is subjected to HPP. The duration of HPP and amount of pressure are selected to fully eliminate the epiphytic microflora of the food product. For example, as discussed in more detail above, a pressure in the range from about 100 MPa to about 800 MPa, preferably in the range from about 300 MPa to about 650 MPa, can be selected depending on the type of the food product undergoing HPP. Similarly, the time of exposure to HPP is selected depending on the type of food product. For example from about 1 minute to about 10 minute. In one example, HPP pressure is about 600 MPa and the duration of HPP is 6 minutes. The biologically active substance remains active during HPP. After the HPP, the biologically active substance is released to a portion of the food packaging container including the food product, for example, due to the configuration of the food packaging container (e.g., its cap, as described, for example, in FIGS. 5A-5C), whereby inoculating the food product with the biologically active substance. In some embodiments, the food packaging container is configured such that a consumer needs to take an action to cause the biologically active substance come in contact with the food product within the food packaging container. Regardless of the specific configuration of the food packaging container, after HPP, the food packaging container includes only the treated food product (e.g., a sterile food product) and the biologically active substance.

In some embodiments, the food packaging container is incubated at about 37° C. to about 39° C. for about 4-6 hours, such that the food product, mixed with the biologically active substance, becomes at least partially fermented. In this way, HPP, inoculation of the food product with the biologically active substance, and fermentation of the inoculated food product occur with the closed food packaging container, thereby producing a pasteurized fermented product. The resulting fermented food product may include a large number of probiotic cultures, including the products of their metabolism, such as, e.g., organic acids, essential amino acids, vitamins, ferments, antibacterial substances, anti-inflammatory substances, etc. Also, the organoleptic properties of the fermented food product are preserved.

EQUIVALENTS

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

Those skilled in the art will recognize, or be able to ascertain, using no more than routine experimentation, numerous equivalents to the specific embodiments described specifically herein. Such equivalents are intended to be encompassed in the scope of the following claims.

INCORPORATION BY REFERENCE

All patents and publications referenced herein are hereby incorporated by reference in their entireties.

The publications discussed herein are provided solely for their disclosure prior to the filing date of the present application. Nothing herein is to be construed as an admission that the present invention is not patentable in view of such publications.

As used herein, all headings are simply for organization and are not intended to limit the disclosure in any manner. The content of any individual section may be equally applicable to all sections.

What is claimed is:

1. A method of high pressure processing (HPP) of a food product and an additional high-pressure-sensitive substance in a food packaging container, comprising:
   obtaining the additional high-pressure-sensitive substance;
   converting the additional high-pressure-sensitive substance into an HPP-resistant form, wherein the HPP-resistant form consists of the additional high-pressure-sensitive substance; wherein the additional high-pressure substance in the HPP-resistant form does not include encapsulation;
   adding the HPP-resistant form to the food packaging container with the food product, and subjecting the food packaging container to HPP at a pressure from about 100 MPa to about 1,000 MPa, while maintaining the additional high-pressure-sensitive substance in a substantially dry and HPP-resistant form until HPP is completed.

2. The method of claim 1, wherein the HPP-resistant form is a compressed form of the additional high-pressure-sensitive substance.

3. The method of claim 2, wherein the additional high-pressure-sensitive substance is compressed into the compressed form having a size and a shape such that the compressed additional high-pressure-sensitive substance is able to withstand the pressure applied to the food packaging container during HPP.

4. The method of claim 2, wherein the additional high-pressure-sensitive substance is compressed to form multiple compressed forms with the same or different shapes and sizes.

5. The method of claim 2, wherein a dimension of the compressed form is in the range from about 1 mm to about 20 mm.

6. The method of claim 2, wherein the compressed additional high-pressure-sensitive substance begins to disintegrate and rehydrate inside the food product container after the HPP has been completed due to exposure to moisture in the food product.

7. The method of claim 1, wherein the HPP-resistant form is separated from the food product by a barrier.

8. The method of claim 7, wherein the barrier is configured to change configuration during HPP as a result of a pressure of HPP being exerted on the food packaging container, whereby the HPP-resistant form contacts the food product.

9. The method of claim 7, wherein the barrier is configured to change configuration after HPP is completed, whereby the HPP-resistant form contacts the food product.

10. The method of claim 9, wherein the change of the configuration is caused by a release of a pressure of HPP exerted on the food packaging container.

11. The method of claim 1, wherein the food product comprises a beverage.

12. The method of claim 1, wherein the food product comprises a dairy product.

13. The method of claim 1, wherein the food packaging container is subjected to HPP for a period from about 1 minute to about 15 minutes.

14. The method of claim 13, wherein the food packaging container is subjected to multiple HPP cycles of same or different duration.

15. The method of claim 1, wherein the HPP-resistant form of the additional high-pressure-sensitive substance is obtained by spray-drying or freeze-drying.

16. The method of claim 1, wherein the additional high-pressure-sensitive substance has a biological activity.

17. The method of claim 16, wherein, after HPP is completed, the additional high-pressure-sensitive substance has at least some level of the biological activity that the additional high-pressure-sensitive substance had prior to HPP.

18. The method of claim 1, wherein the additional high-pressure-sensitive substance comprises one or more of probiotics, bacteria, yeasts, prebiotics, microbial metabolites, enzymes, or nutraceuticals.

19. The method of claim 1, wherein the additional high-pressure-sensitive substance comprises at least one probiotic species selected from the group consisting of *Streptococcus thermophilus, Lactobacillus bulgaricus, L. acidophilus, L. lactis, L. casei, L. paracasei, L. brevis, L. plantarum, L. rhamnosus, L. fermentum, L. salivarius, L. caucasicus, L. helveticus, L. reuteri, L. johnsonii, L. grasseri, Bifidobacterium bifidum, B. infantis, B. longum, B. thermophilum, Saccharomyces boulardii, Bacillus subtilis, B. lichenformis, Enterococcus faecium*, and *Propionibacterium jensenii*.

20. The method of claim 1, wherein the HPP-resistant form is selected from a group consisting of one or more of a powder, a pill, a tablet, a pellet, an agglomerate, a granule, a block, a briquette, or a caplet.

21. The method of claim 1, wherein the HPP-resistant form is a compressed material obtained by applying a compression pressure to the additional high-pressure-sensitive substance.

22. The method of claim 1, wherein after completion of HPP, the food packaging container is exposed to an elevated temperature of about 38° C. to about 46° C., whereby the food product becomes a fermented food product.

23. The method of claim 6, wherein the HPP-resistant form does not disintegrate for a period of time selected from a group consisting of at least about 15 minutes, at least about 30 minutes, at least about 45 minutes, and at least about 60 minutes from a time when it is added to the container with the food product.

24. The method of claim 1, wherein the additional high-pressure-sensitive substance is in contact with the food product at the completion of HPP.

25. The method of claim 1, wherein the additional high-pressure-sensitive substance is in contact with the food product before HPP.

26. The method of claim 1, wherein the additional high-pressure-sensitive substance is in contact with the food product during HPP.

* * * * *